United States Patent
Park et al.

(10) Patent No.: US 10,558,273 B2
(45) Date of Patent: Feb. 11, 2020

(54) ELECTRONIC DEVICE AND METHOD FOR CONTROLLING THE ELECTRONIC DEVICE

(71) Applicant: Samsung Electronics Co., Ltd., Suwon-si, Gyeonggi-do (KR)

(72) Inventors: Joon-ah Park, Seoul (KR); Jin-ho Kim, Suwon-si (KR); Hyun-jung Nam, Hwaseong-si (KR); Ju-young Park, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/020,370

(22) Filed: Jun. 27, 2018

(65) Prior Publication Data

US 2019/0064931 A1   Feb. 28, 2019

(30) Foreign Application Priority Data

Aug. 23, 2017   (KR) .................. 10-2017-0106523

(51) Int. Cl.
*G06F 3/0488* (2013.01)
*G06F 3/042* (2006.01)
(Continued)

(52) U.S. Cl.
CPC .............. *G06F 3/017* (2013.01); *G06F 1/163* (2013.01); *G06F 3/011* (2013.01); *G06F 3/0304* (2013.01);
(Continued)

(58) Field of Classification Search
CPC .......... G06F 1/163; G06F 3/011; G06F 3/014; G06F 3/01673; G06F 3/017;
(Continued)

(56) References Cited

U.S. PATENT DOCUMENTS

| | | | | |
|---|---|---|---|---|
| 8,624,836 B1 * | 1/2014 | Miller | ..................... | G06F 1/163 345/157 |
| 8,743,079 B2 | 6/2014 | Norieda | | |

(Continued)

FOREIGN PATENT DOCUMENTS

| | | |
|---|---|---|
| JP | 2014/106765 A | 6/2014 |
| KR | 10-1534282 B1 | 7/2015 |

(Continued)

*Primary Examiner* — Michael J Eurice
(74) *Attorney, Agent, or Firm* — Jefferson IP Law, LLP

(57) ABSTRACT

An electronic device is provided. The electronic device includes a sensor module configured to detect an object positioned near the electronic device, a display, a memory storing instructions, and a processor electrically coupled with the sensor module, the display, and the memory. The processor, when executing the instructions, is configured to control the display to display first information guiding a portion of a user's body positioned near the electronic device to maintain a first posture, to acquire a first sensing value by using the sensor module while the first posture is maintained, to control the display to display second information guiding an object to be positioned on one point of the portion of the user's body, to acquire a second sensing value for the object by using the sensor module while the object is positioned on the one point, and to determine a first correction value by using the first sensing value and the second sensing value.

20 Claims, 19 Drawing Sheets

(51) Int. Cl.
*G06F 3/01* (2006.01)
*G06F 3/038* (2013.01)
*G06F 1/16* (2006.01)
*G06F 3/03* (2006.01)

(52) U.S. Cl.
CPC .............. *G06F 3/038* (2013.01); *G06F 3/042* (2013.01); *G06F 3/0426* (2013.01); *G06F 3/04883* (2013.01)

(58) Field of Classification Search
CPC .... G06F 3/0421; G06F 3/0426; G06F 3/0488; G06F 3/04895; G06F 2203/04101
See application file for complete search history.

(56) References Cited

U.S. PATENT DOCUMENTS

| | | | |
|---|---|---|---|
| 9,727,131 B2 | 8/2017 | Lim et al. | |
| 2010/0289740 A1* | 11/2010 | Kim | G04G 21/04 345/157 |
| 2011/0043702 A1* | 2/2011 | Hawkins | G06F 3/017 348/584 |
| 2012/0249409 A1 | 10/2012 | Toney et al. | |
| 2013/0197681 A1* | 8/2013 | Alberth, Jr. | G06F 1/163 700/94 |
| 2014/0306891 A1* | 10/2014 | Latta | G06F 3/017 345/158 |
| 2014/0347295 A1* | 11/2014 | Kim | G06F 1/163 345/173 |
| 2015/0054730 A1* | 2/2015 | Kodama | G09G 3/001 345/156 |
| 2015/0085621 A1* | 3/2015 | Hong | G04G 21/00 368/10 |
| 2015/0177836 A1* | 6/2015 | Ouchi | G06F 3/014 345/156 |
| 2015/0309535 A1* | 10/2015 | Connor | G06F 1/163 361/679.03 |
| 2015/0323998 A1* | 11/2015 | Kudekar | G06F 1/163 345/156 |
| 2015/0324000 A1* | 11/2015 | Park | G06F 3/014 345/156 |
| 2016/0018948 A1* | 1/2016 | Parvarandeh | G06F 1/169 345/175 |
| 2016/0034764 A1* | 2/2016 | Connor | G06K 9/00771 348/158 |
| 2016/0116983 A1* | 4/2016 | Lim | G06F 3/011 345/156 |
| 2016/0127624 A1* | 5/2016 | Woo | H04N 9/3173 348/36 |
| 2016/0266606 A1* | 9/2016 | Ricci | G06F 1/163 |
| 2016/0349803 A1* | 12/2016 | Dusan | G04C 3/002 |
| 2017/0123487 A1* | 5/2017 | Hazra | G06F 3/015 |
| 2017/0280394 A1* | 9/2017 | Kim | G06F 1/1694 |
| 2018/0087984 A1* | 3/2018 | Hagelin | G01L 9/001 |
| 2018/0192946 A1* | 7/2018 | Adachi | A61B 5/022 |

FOREIGN PATENT DOCUMENTS

| | | |
|---|---|---|
| KR | 10-2015-0127530 A | 11/2015 |
| KR | 10-2016-0047775 A | 5/2016 |

* cited by examiner

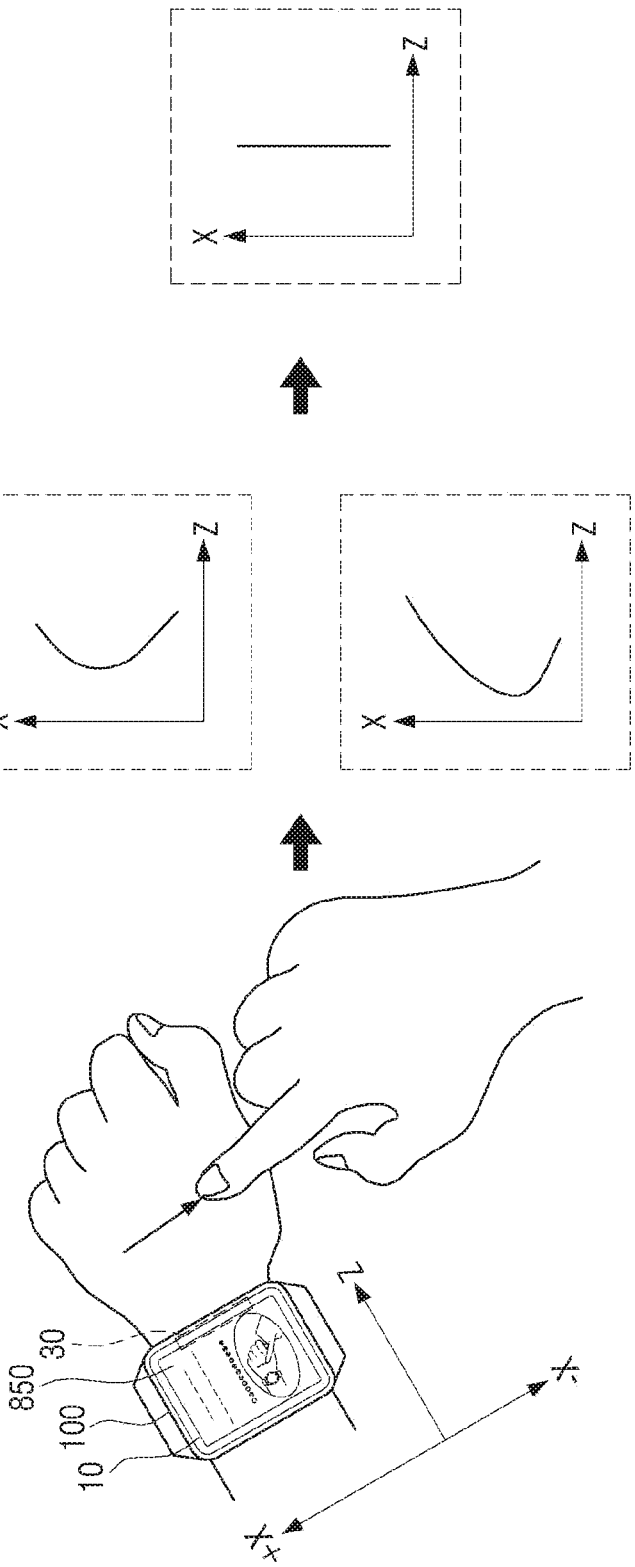

ELECTRONIC DEVICE AND METHOD FOR CONTROLLING THE ELECTRONIC DEVICE

CROSS-REFERENCE TO RELATED APPLICATION(S)

This application is based on and claims priority under 35 U.S.C. § 119(a) of a Korean patent application number 10-2017-0106523, filed on Aug. 23, 2017, in the Korean Intellectual Property Office, the disclosure of which is incorporated by reference herein in its entirety.

BACKGROUND

1. Field

The disclosure relates to an electronic device and a method for controlling the electronic device. More particularly, the disclosure relates to a technique of controlling the electronic device by using a virtual input area.

2. Description of Related Art

The distribution of a variety of electronic devices, such as a smart phone, a tablet personal computer (PC), a portable multimedia player (PMP), a personal digital assistant (PDA), a laptop PC, a wearable device, and the like, has provided a user with a variety of input methods for convenient control environment.

A user input method of an electronic device includes an input using buttons and a touch input method using a touch screen.

The above information is presented as background information only to assist with an understanding of the disclosure. No determination has been made, and no assertion is made, as to whether any of the above might be applicable as prior art with regard to the disclosure.

SUMMARY

In the case of a device of which an area of a touch screen is small, such as a wearable electronic device, a touch input method using the touch screen may be inconvenient. In the case of a wearable electronic device, it may be difficult to display a variety of menus on one screen because a portion of the screen is hidden by a user's finger or due to the restriction of a screen size.

In addition, the wearable electronic device may be controlled by setting a human body part adjacent to the wearable electronic device as a virtual input area and performing a touch input and the like. However, due to a characteristic of human body that is not a flat surface such as a touch screen, there may be a problem that an error occurs in an input.

Aspects of the disclosure are to address at least the above-mentioned problems and/or disadvantages and to provide at least the advantages described below. Additional aspects will be set forth in part in the description which follows and, in part, will be apparent from the description, or may be learned by practice of the presented embodiments.

In accordance with an aspect of the disclosure, an electronic device is provided. The electronic device includes a sensor module configured to detect an object positioned near the electronic device, a display, a memory storing instructions, and a processor electrically coupled with the sensor module, the display and the memory. The processor may, when executing the instructions, is configured to control the display to display first information guiding a portion of a user's body positioned near the electronic device to maintain a first posture, to acquire a first sensing value by using the sensor module while the first posture is maintained, to control the display to display second information guiding an object to be positioned on one point of the portion of the user's body, to acquire a second sensing value for the object by using the sensor module while the object is positioned on the one point, and to determine a first correction value by using the first sensing value and the second sensing value.

In accordance with another aspect of the disclosure, a method for controlling an electronic device is provided. The method includes displaying first information guiding a portion of a user's body positioned near the electronic device to maintain a first posture, while the first posture is maintained, acquiring a first sensing value by using a sensor module, displaying second information guiding an object to be positioned at one point of the portion of the user's body, while the object is positioned at the one point, acquiring a second sensing value for the object by using the sensor module, and determining a first correction value by using the first sensing value and the second sensing value.

According to the various example embodiments, when a human body, such as a back of user's hand and the like, is used as a virtual input area, an error of data detected by a sensor module can be corrected by a light positioned on the periphery of the electronic device.

According to the various example embodiments, in a case where a user input occurs after information relating to a characteristic of a human body, such as a curve of a back of a user's hand and the like, is stored in advance, an input error can be reduced by reflecting the characteristic of the human body.

According to the various example embodiments, a characteristic of a human body, such as a curve of a back of a user's hand, and a user's handwriting can be stored and used as certification information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A, 8B, and 8C illustrate situations where an electronic device derives a change according to a curve of a back of a hand, according to an embodiment of the disclosure;

FIGS. 10A-1, 10A-2, and 10B illustrate situations where an electronic device changes feature information when a trajectory drawn on a back of a hand is moved, according to an embodiment of the disclosure;

Throughout the drawings, it should be noted that like reference numbers are used to depict the same or similar elements, features, and structures.

DETAILED DESCRIPTION

Figure 1A:
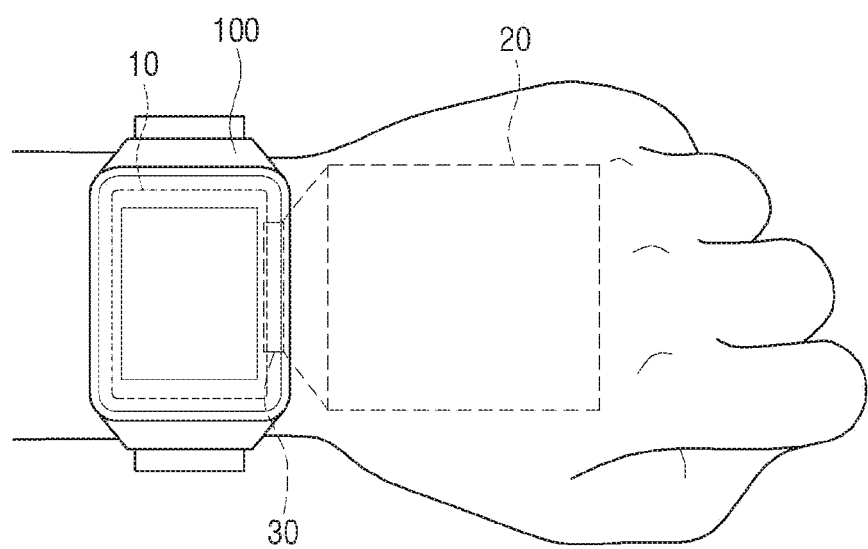
FIG. 1A is a diagram illustrating an electronic device and a virtual input area, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, "configured to (or set to)" as used herein may, for example, be used interchangeably with "suitable for", "having the ability to", "altered to", "adapted to", "capable of" or "designed to" in hardware or software. Under certain circumstances, the term "device configured to" may refer to "device capable of" doing something together with another device or components. For example, "a processor configured (or set) to perform A, B, and C" may refer to an exclusive processor (e.g., an embedded processor) for performing the corresponding operations, or a general-purpose processor (e.g., a central processing unit (CPU) or an application processor (AP)) capable of performing the corresponding operations by executing one or more software programs stored in a memory device.

Electronic devices in accordance with various embodiments of the disclosure may include at least one of, for example, smart phones, tablet personal computers (PCs), mobile phones, videophones, electronic book readers, desktop PCs, laptop PCs, netbook computers, workstations, a portable multimedia player (PMP), an MP3 player, a medical device, a camera, and a wearable device. A wearable device may include at least one of an accessory type (e.g., a watch, a ring, a bracelet, a bracelet, a necklace, a pair of glasses, a contact lens, or a head-mounted-device (HMD)), a textile or garment-integrated type (e.g., electronic clothes), a body attachment-type (e.g., skin pads or tattoos), and an implantable circuit. In some embodiments, the electronic device may, for example, include at least one of a television, a digital video disc (DVD) player, an audio, a refrigerator, an air conditioner, a vacuum cleaner, an oven, a microwave oven, a washing machine, may include at least one of a panel, a security control panel, a media box (e.g., Samsung HomeSync™, Apple TV™, or Google TV™), a game console (e.g., Xbox™, PlayStation™), electronic dictionary, electronic key, camcorder, and an electronic frame.

In another embodiment, the electronic device may include at least one of any of a variety of medical devices (e.g., various portable medical measurement devices such as a blood glucose meter, a heart rate meter, a blood pressure meter, or a body temperature meter), magnetic resonance angiography (MRA), magnetic resonance imaging (MRI), computed tomography (CT), camera, or ultrasonic, etc.), a navigation system, a global navigation satellite system (GNSS), an event data recorder (EDR), a flight data recorder (FDR), an automobile infotainment device, a marine electronic equipment (for example, marine navigation devices, gyro compass, etc.), avionics, security devices, head units for vehicles, industrial or domestic robots, drone, ATMs at financial institutions, point of sales (POS), or an Internet of things (TOT) devices (e.g., a light bulb, various sensors, a sprinkler device, a fire alarm, a thermostat, a streetlight, a toaster, a fitness appliance, a hot water tank, a heater, a boiler, etc.). According to some embodiments, the electronic device may include at least one of a piece of furniture, a building/structure or part of an automobile, an electronic board, an electronic signature receiving device, a projector, gas, and various measuring instruments (e.g., water, electricity, gas, or radio wave measuring instruments, etc.). The electronic device according to the embodiment of the disclosure is not limited to the above-mentioned devices.

In various embodiments, the electronic device may be a combination of one or more of the above-described electronic devices. According to various example embodiments, the electronic device may be a flexible device. Hereinafter, it will be assumed that an electronic device is a wearable electronic device wearable around a wrist.

FIG. 1A is a diagram illustrating an electronic device and a virtual input area, according to an embodiment of the disclosure.

FIG. 1A illustrates an electronic device 100 which is wearable around a wrist, a display 10 of the electronic device 100, and a virtual input area 20. The virtual input area 20 may be at least a partial area from among peripheral areas of the electronic device 100. The user may carry out a user input for the virtual input area 20 to control the electronic device 100.

According to an example embodiment, the electronic device 100 may include, on a side surface, at least one sensor module 30 which is capable of measuring a degree of distance or proximity. The sensor module 30 may, for example, include a sensor for measuring a distance, a sensor for measuring a light amount, and the like. The sensor module 30 may measure a distance between the electronic device 100 and an object (e.g., a user's finger and the like) by using information about an x-axis and a y-axis based on the sensor module 30.

According to various embodiments, in a case in which the sensor module 30 is arranged in two or more layers, it is possible to identify a three-dimensional (3D) position immediately before the object or the like comes into contact with the virtual input area by measuring all of the X, Y, and Z axis positions.

A variety of functional objects may be displayed on the display 10 of the electronic device 100. A functional object may, for example, be a function executing object which may be selected by the user, such as an icon, a list, a button, a picture, a character, a symbol, and the like, or a functional object which provides various information.

Accordingly, for example, in a state in which a function executing object is displayed on the display 10, when the user carries out a user input to select one spot of the virtual input area 20, the electronic device 100 may select or execute a function executing object positioned at one spot of the display 10 that corresponds to the selected spot.

FIGS. 1B, 1C, 1D, and 1E illustrate situations where an electronic device corrects an input signal a sensor module receives, according to an embodiment of the disclosure.

Figure 1B:
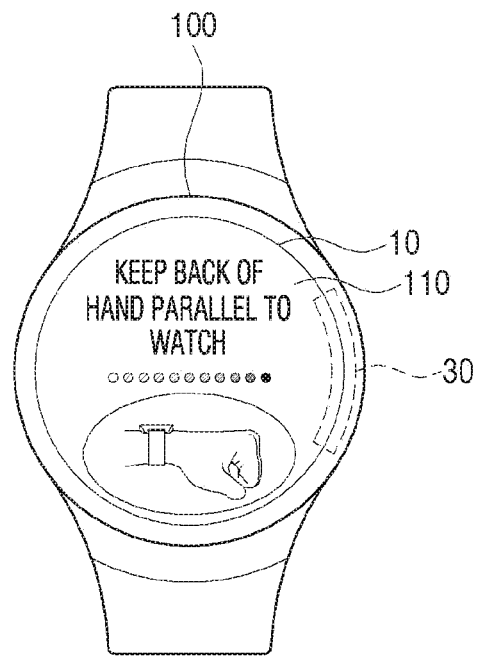
FIGS. 1B, 1C, 1D, and 1E illustrates situations where an electronic device corrects an input signal a sensor module receives, according to an embodiment of the disclosure.

Referring to FIG. 1B, the electronic device 100 may display, on the display 10, first information 110 for guiding a partial area included in a user's body to maintain a first posture with respect to the electronic device 100.

For example, the electronic device 100 may display, on the display 10, first information 110 guiding to maintain a back of a user's hand to be parallel with the electronic device 100. In this case, the first posture may be a state in which a position of a back of a hand is parallel with the display 10 of the electronic device 100. In this case, the electronic device 100 may user a back of a user's hand as a virtual input area. However, a virtual input area which may be used by the electronic device 100 is not limited to a back of a hand.

Figure 1D:
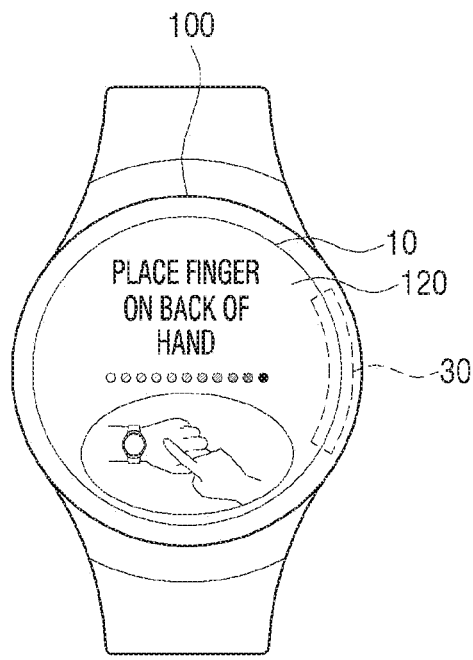
Figure 1C:
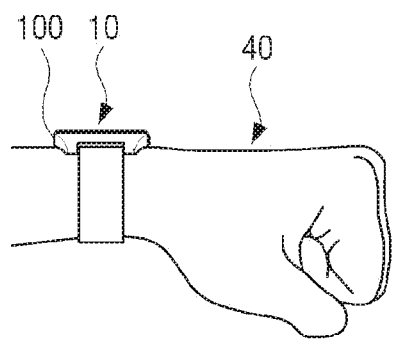

Referring to FIG. 1C, a user may maintain a back of his or her hand 40 to be parallel with the display 10 of the electronic device 100 according to contents of the first information 110. In this case, the electronic device 100 may store a sensing value received through the sensor module 30 as a first sensing value.

According to an embodiment, the electronic device 100 may, after displaying the first information 110 on the display 10, display a remaining time for which the back of the hand 40 has to be parallel with the electronic device 100 with a number. The user may maintain the back of his or her hand to be parallel with the display 10 for the remaining time. However, the example is not limited thereto. For example, the electronic device 100 may change a color displayed on the display 10 and notify a time for which the user maintains the back of his or her hand 40 to be parallel to the electronic device.

According to an embodiment, the sensor module 30 may, for example, include a sensor for receiving an amount of light reflected after the light is scanned or a time it takes for the light to be reflected after being scanned. In addition, the sensor module 30 may, for example, include a sensor for receiving a signal which returns after being reflected after an infrared (IR) ray, an ultrasonic wave, or the like is scanned. That is, in a case in which an object (e.g., a finger and the like) is not present on the back of a user's hand 40, the electronic device 100 may store a sensing value received through the sensor module 30 as a first sensing value.

According to an embodiment, the electronic device 100 may, after the first sensing value is stored, display different information from the first information 110 on the display 10.

Referring to FIG. 1D, the electronic device 100 may display, on the display 10, second information 120 for guiding an object (e.g., a finger and the like) to be positioned at one spot of a partial area included in a user's body.

For example, the electronic device 100 may display, on the display 10, the second information 120 for guiding an object (e.g., a finger and the like) to be positioned at one spot of the back of the user's hand.

Figure 1E:
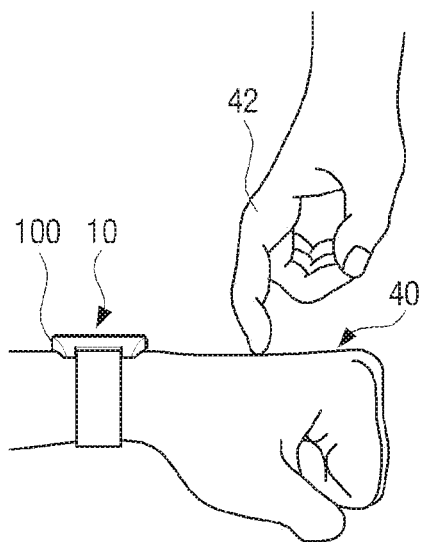

Referring to FIG. 1E, the user may position a finger 42 at one spot of the back of his or her hand 40 according to contents of the second information 120. In this regard, the electronic device 100 may store a sensing value received through the sensor module 30 as a second sensing value.

According to an embodiment, the electronic device 100 may, after displaying the second information 120 on the display 10, display a remaining time for which the finger has to be maintained to be positioned on the back of the hand with a number. The user may position the finger on the back of the hand for the remaining time. However, the example is not limited thereto. For example, the electronic device 100 may change a color displayed on the display 10 and notify a time for which the user positions and maintains the finger on the back of the hand.

The electronic device 100 according to an embodiment may derive a first correction value by using a first sensing value and a second sensing value. For example, the electronic device 100 may derive a first correction value by using a difference between a sensing value detected by the sensor module 30 when an object (e.g., the finger 42 and the like) is detected in a virtual input area (e.g., the back of a user's hand 40 and the like) and a sensing value detected by the sensor module 30 when an object (e.g., the finger 42 and the like) is not detected.

According to an embodiment, the electronic device 100 may store a first coordinate system set by the manufacturer of the electronic device 100. In a case in which the electronic device 100 is a wrist wearable electronic device, the electronic device 100 may store a first coordinate system corresponding to a shape of an average back of a hand input by the manufacturer. In this case, the points of the first coordinate system may correspond to the spots of an area of the display 10, respectively.

Accordingly, when a first correction value is applied to the first coordinate system, the electronic device 100 may reduce malfunction that may occur when a user input is sensed on the back of the hand.

According to various embodiments, the electronic device 100 may, before the first information 110 is displayed on the display 10, display, on the display 10, information indicating that a process of correcting a sensing value input through the sensor module 30 is started. Further, the electronic device 100 may provide information to the user by using an audio output function. For example, the electronic device 100 may output a voice informing that a process of correcting an input signal is initially started.

Likewise, the electronic device 100 may display the first information 110, and simultaneously or sequentially, output a voice guiding a partial area included in a user's body to maintain the first posture with respect to the electronic device 100 by means of a speaker included in the electronic device 100 and the like.

According to the various embodiments, the electronic device 100 may output a remaining period for which the partial area included in the user's body has to maintain the first posture with respect to the electronic device 100 as a voice or a vibration.

When the second information 120 is displayed, the electronic device 100 may likewise output the same contents as the contents of the second information 120 as a voice and provide the output voice to the user.

According to the various embodiments, the electronic device 100 may output a remaining period for which an object (e.g., a finger and the like) has to maintain to be positioned on the back of the user's hand as a voice or a vibration.

According to the various embodiments, the electronic device 100 may, instead of displaying information on the display 10, carry out a process of correcting a sensing value input through the sensor module by using only a voice guide.

Figure 2A:
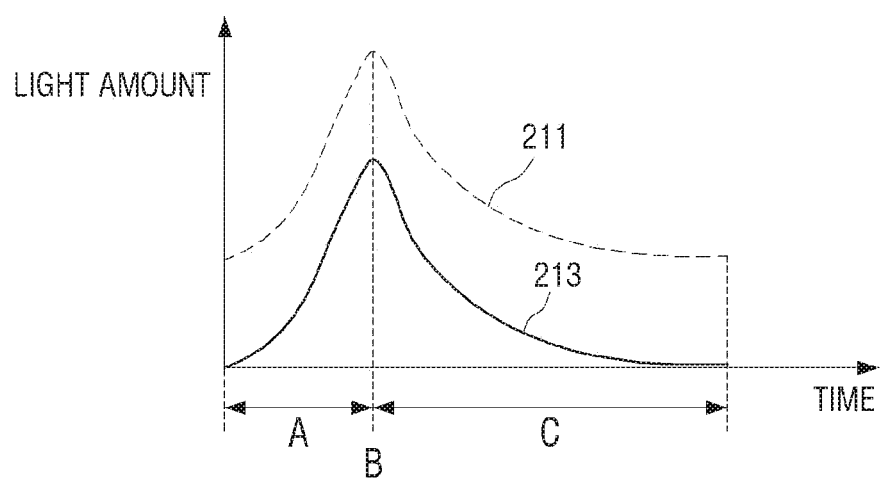
FIGS. 2A and 2B illustrate states of a sensing value received in a sensor module included in an electronic device, according to an embodiment of the disclosure.
Figure 2B:
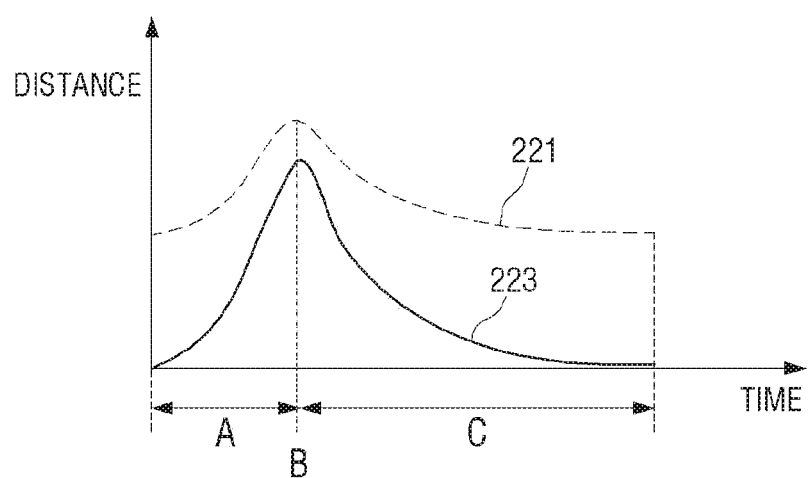

FIGS. 2A and 2B illustrate states of a sensing value received in a sensor module included in an electronic device, according to an embodiment of the disclosure.

For example, the graphs of FIGS. 2A and 2B may indicate a change of a sensing value (e.g., a distance and an amount of light) that a sensor module (e.g., a sensor module 30 of FIG. 1A) included in the electronic device 100 receives from a virtual input area (e.g., a back of a user's hand).

According to the various embodiments, the interval A of the graphs illustrated in FIGS. 2A and 2B may be an interval in which an object (e.g., a finger) approaches a virtual input area (e.g., a back of a user's hand). The interval B may be a moment when the object (e.g., a finger) touches the virtual input area (e.g., a back of a user's hand). In addition, the interval C may be an interval in which the object (e.g., a finger) is moved far away from the virtual input area (e.g., a back of a user's hand).

The graph illustrated in FIG. 2A is a graph provided to explain a change (y-axis) in an amount of light derived by the electronic device 100 according to a change in time (x-axis).

Referring FIG. 2A, a first curved line 211 may be a curved line that expresses a sensing value detected by the electronic device 100 through a sensor module (e.g., the sensor module 30 of FIG. 1A) in a state that the first correction value described with reference to FIGS. 1B, 1C, 1D, and 1E is not applied. A second curved line 213 may be a curved line that expresses a state in which the first correction value is applied to a sensing value that the electronic device 100 detects through a sensor module (e.g., the sensor module 30 of FIG. 1A). Accordingly, the electronic device 100 may determine a difference between the first curved line 211 and the second curved line 213 as a first correction value.

The graph illustrated FIG. 2B is a graph provided to explain a change (y-axis) in a distance derived by the electronic device 100 according to a change in time (x-axis).

Referring to FIG. 2B, a third curved line 221 may be a curved line that expresses a sensing value detected by the electronic device 100 through a sensor module (e.g., the sensor module 30 of FIG. 1A) in a state that the first correction value described with reference to FIGS. 1B, 1C, 1D, and 1E is not applied. A fourth curved line 223 may be a curved line that expresses a state in which the first correction value is applied to a sensing value that the electronic device 100 detects through a sensor module (e.g., the sensor module 30 of FIG. 1A). Accordingly, the electronic device 100 may determine a difference between the third curved line 221 and the fourth curved line 223 as a first correction value.

According to the various embodiments, the electronic device 100 may use a sensor module (e.g., the sensor module 30 of FIG. 1A) which simultaneously includes a sensor for measuring an amount of light and a sensor for measuring a distance value. For example, the electronic device 100 may measure, using the sensor for measuring an amount of light, a reflective light generated by being adjacent to a virtual input area. In addition, the electronic device 100 may measure an error of distance values generated by an obstacle adjacent to the virtual input area using the sensor for measuring a distance (e.g., an IR ray sensor, an ultrasonic sensor, a radar sensor, and the like), and determine a first correction value.

Accordingly, the electronic device 100 apply the first correction value to a sensing value received through a sensor module (e.g., the sensor module 30 of FIG. 1A), thereby reducing an error that a sensing value is received even when a user input does not occur.

Figure 3:
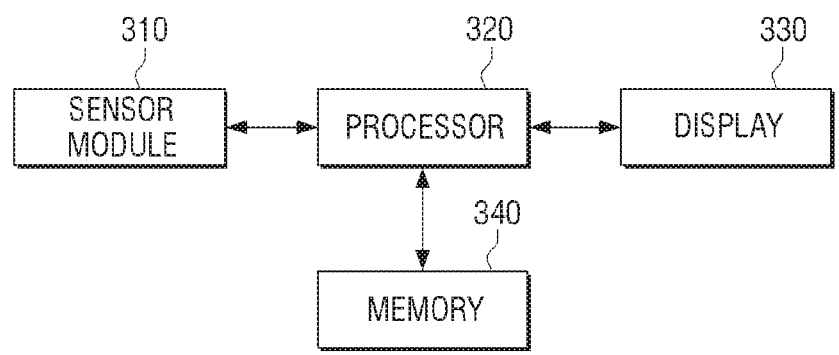
FIG. 3 is a brief block diagram of an electronic device, according to an embodiment of the disclosure.

FIG. 3 is a brief block diagram of an electronic device, according to an embodiment of the disclosure.

Referring to FIG. 3, the electronic device 100 may include a sensor module 310, a processor 320, a display 330, and a memory 340. However, the example is not limited thereto.

The sensor module 310 may detect a user input in a virtual input area. The sensor module 310 may include the sensor module 30 of FIG. 1A. The sensor module 310 may include sensors, such as a sensor array and the like, and a sensor controller which is connected to the sensors to carry out signal processing of a user input and controls the sensors. However, the example is not limited thereto. For example, the sensor module 310 may include only sensors, and the processor 320 may carry out a role of a sensor controller.

The signal processing may include a noise filtering with respect to a signal input from the sensors. The user input may include a tap input, a touch-and-hold input, a double tap input, a drag input, a panning input, a flick input, a drag-and-drop input, a swipe input and a pinch input of the user with respect to a virtual input area.

The sensor array may include a plurality of distance and proximity array sensors, or may be implemented as a line type sensor. In addition, the sensor array may be designed as a structure of a plurality of layers. In a case in which the sensor array is designed to be a plurality of layers, it is possible to detect not only two-dimensional (2D) positions of the x-axis and the y-axis but also 3D positions of the x-axis, the y-axis, and the z-axis.

According to an embodiment, a sensor array may include a plurality of ultrasonic sensors. The ultrasonic sensor may, in a case in which a position of a finger is identified, transmit or receive a pulse of an ultrasonic wave, measure a moving time of the ultrasonic wave by a tripodal measurement of a pulse arrival time, and then calculate the position of the finger. When an ultrasonic sensor array is used, it may be implemented to be low power and may not be affected by a lighting environment, such as sunlight and the like.

According to the various embodiments, the sensor array may include a 3D sensor in a line form. When a 3D sensor is used, it is possible to provide a high-resolution positional accuracy in an input area which is a peripheral area of a wearable device such as a back of a hand and thus, the 3D sensor may be used for precise pattern recognition (e.g., character recognition and the like).

According to the various embodiments, a sensor array may include a dynamic vision sensor (DVS). When a DVS is used, ultra-low-power operation is possible, and it is possible to detect the motion of the object quickly in an always-on state.

According to the various embodiments, a sensor array may include a plurality of IR sensors. When an IR sensor is used, when a signal is transmitted from the sensor, a position of a finger may be calculated by measuring an intensity of a touch of a finger, and a 2D position of the finger on an input area which is a peripheral area of a wearable device may be detected.

An example of a wearable device that is worn around a wrist is described above. However, a wearable device may be worn on an arm using an arm band and the like. In this case, it may be possible for the user to detect a user input in a virtual input area which is a peripheral area of a wearable device even on the arm as well as on the back of the hand.

The display 330, for example, may include a liquid crystal display (LCD), a light-emitting diode (LED) display, an organic light-emitting diode (OLED) display, a microelectromechanical systems (MEMS) display, or an electronic paper display. The display 330 may include the display 10 of FIG. 1A.

The processor 320 may, for example, control a number of hardware or software elements connected to the processor 320 by driving an operating system or application program, and perform various data processing and calculations.

According to an embodiment, the processor 320 may control the display 330 to display first information to guide a partial area included in a user's body to be parallel to the display 330 of the electronic device 100. In this case, the processor 320 may control the memory 340 to store a sensing value received through the sensor module 310 as a first sensing value.

The processor 320 may control the display 330 to display second information for guiding an object (e.g., a finger, etc.) to be positioned at one spot of a partial area included in a user's body. In this regard, the processor 320 may control the memory 340 to store a sensing value received through the sensor module 310 as a second sensing value in response to a user input.

According to an embodiment, the processor 320 may store a difference between the first sensing value and the second sensing value as a first correction value, and thereafter, when a user input is generated in a partial area included in a user's body, apply the first correction value to a sensing value received through the sensor module 310 and detect a position at which the user input is generated.

The memory 340 may, for example, include an internal memory or an external memory. The internal memory may include at least one of, for example, a volatile memory (e.g., a dynamic random access memory (DRAM), a static random access memory (SRAM), or a synchronous dynamic random access memory (SDRAM)), a nonvolatile memory (e.g., a one time programmable read only memory (OTPROM), a programmable read only memory (PROM), an erasable and programmable read only memory (EPROM), an electrically erasable and programmable read only memory (EEPROM), a mask read only memory (ROM), a flash ROM, a flash memory, a hard drive, and a solid state drive (SSD). The external memory may include a flash drive, for example, a compact flash (CF), a secure digital (SD), a micro-SD, a mini-SD, an extreme digital (xD), a multi-media card (MMC), a memory stick, or the like. The external memory may be functionally or physically connected to the electronic device 100 via various interfaces.

According to an embodiment, the memory 340 may store a first sensing value, a second sensing value, a first correction value, and the like, under the control of the processor 320.

FIGS. 4A, 4B, 4C, and 4D illustrate operations for an electronic device to execute an input function by using a virtual input area, according to an embodiment of the disclosure.

The user may activate a function (hereinafter referred to as "human body touch function") which is capable of controlling the electronic device 100 by using a partial area included in the user's body in which the electronic device is positioned. For example, the user may activate a human body touch application by using a physical button included in the electronic device 100, or may activate a human body touch function by using a function executing object and the like displayed on the display 10.

According to an embodiment, the electronic device 100 may activate the human body touch function by using a sensing value input through the sensor module 30. To this end, the electronic device 100 may set a threshold range of a sensing value for activating the human body touch function by using a sensing value detected through the sensor module 30.

Figure 4A:
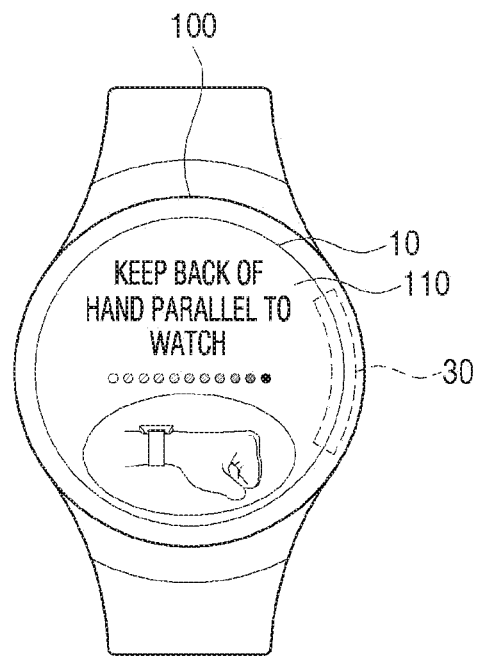
FIGS. 4A, 4B, 4C, and 4D illustrate operations for an electronic device to execute an input function by using a virtual input area, according to an embodiment of the disclosure.

Referring to FIG. 4A, the electronic device 100 may display, on the display 10, first information 110 for guiding a partial area included in a user's body to be in a first posture with respect to the electronic device 100.

For example, the electronic device 100 may display, on the display 10, first information 110 guiding a back of a user's hand to be positioned as being parallel with the electronic device 100. In this case, the first posture may be a state in which a position of a back of a hand is parallel with the display 10 of the electronic device 100. In this case, the electronic device 100 may user a back of a user's hand as a virtual input area.

Figure 4C:
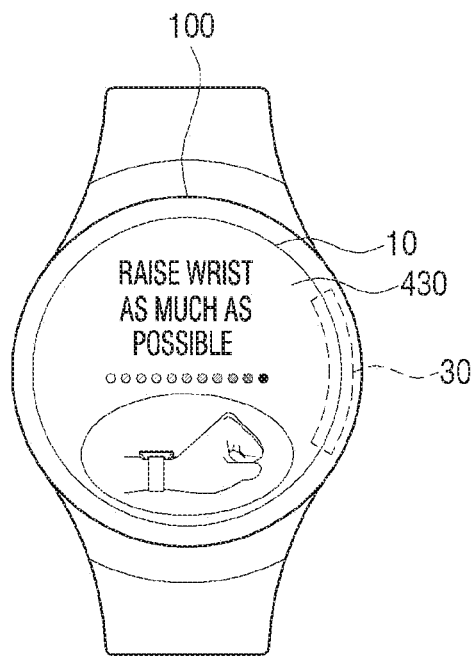
Figure 4B:
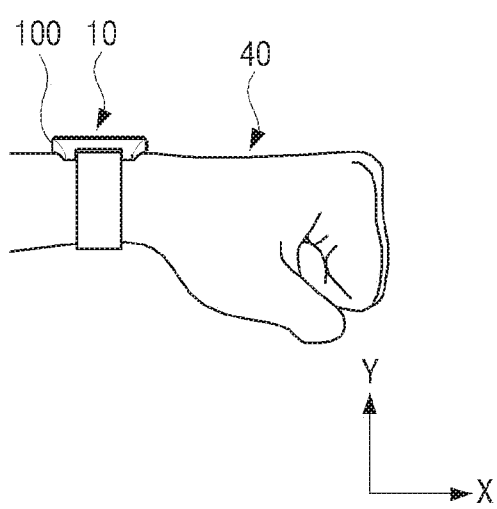

Referring to FIG. 4B, a user may maintain a back of his or her hand (40) to be parallel with the display 10 of the electronic device 100 according to contents of the first information 110. In this case, the electronic device 100 may store a sensing value received through the sensor module 30 as a first sensing value.

According to an embodiment, the electronic device 100 may, after displaying the first information 110 on the display 10, display a remaining time for which the back of the hand 40 has to be parallel with the electronic device 100 with a number. The user may maintain the back of his or her hand to be parallel with the display 10 for the remaining time. However, the example is not limited thereto. For example, the electronic device 100 may change a color displayed on the display 10 and notify a time for which the user has to maintain the back of his or her hand 40 to be parallel to the electronic device.

According to an embodiment, the electronic device 100 may, after the first sensing value is stored, display different information from the first information 110 on the display 10.

Referring to FIG. 4C, the electronic device 100 may display, on the display 10, third information 430 for guiding a partial area included in a user's body to be in a second posture with respect to the electronic device 100.

For example, the electronic device 100 may display, on the display 10, third information 430 guiding a back of a user's hand to be positioned to be closest to the electronic device 100. In this case, the second posture may be a state in which a position of a back of a hand is closest to the sensor module 30 included in the electronic device 100.

Figure 4D:
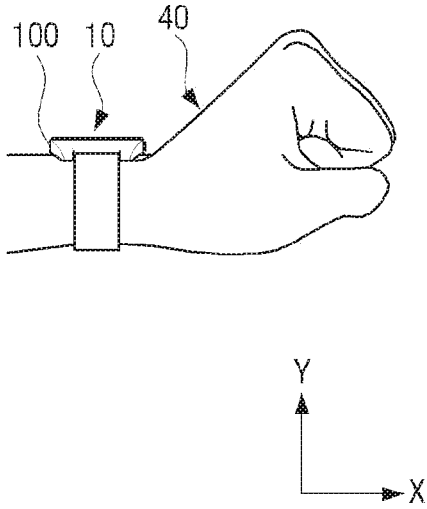

Referring to FIG. 4D, the user may bend his or her wrist in such a manner that the back of the hand 40 forms an obtuse angle with the electronic device 100 according to the contents of the third information 430.

According to an embodiment, the electronic device 100 may display the third information from after the first sensing value is stored, and may store sensing values detected through the sensor module 30 until a predetermined time as a third sensing value.

In other words, the electronic device 100 may store sensing values received through the sensor module 30 from a state that the back of the hand 40 is parallel with the display 10 of the electronic device 100 to a point where the back of the hand 40 is closest to the electronic device 100 as a third sensing value.

According to an embodiment, the electronic device 100 may, after displaying the third information 430 on the display 10, display a remaining time for which the wrist has to maintain a bent state with a number. The user may maintain the wrist in a bent state for the remaining time. However, the example is not limited thereto. For example, the electronic device 100 may change a color displayed on the display 10 and notify a time for which the user has to maintain his or her wrist in a bent state.

In a case in which a sensing value detected through the sensor module 30 is a distance between the sensor module 30 and a back of a hand, provided that a back of a hand is set to be a virtual input area, the electronic device 100 may finalize a posture of a wrist and the back of the hand which is capable of detecting a position of a user input.

For example, as illustrated in FIG. 4D, the electronic device 100 may set a range from a point (0 degree) at which a surface of the display 10 and the back of the hand are in a parallel state to a point at which the display 10 and the back of the hand 40 maintain an angle of approximately 20 degrees as a threshold range of a sensing value which is capable of detecting a position of a user input.

According to another embodiment, the electronic device 100 may apply a first correction value to a stored first coordinate system and set a range from a point at which a distance is not detected from the back of the hand 40 to a point at which a distance from one point of the back of the hand 40 to the electronic device 100 is 100 mm as a threshold range of a sensing value which is capable of detecting an input position of an object (e.g., a finger and the like). The electronic device 100 may execute the human body touch function when a distance between the electronic device 100 and the back of the user's hand 40 is detected to be in the threshold range of the sensing value for a predetermined time or longer.

The electronic device 100 may execute the human body touch function when a distance between the electronic device 100 and the back of the user's hand 40 is detected to be in the threshold range of the sensing value for a predetermined time or longer.

According to various embodiments, the electronic device 100 may, before the first information 110 is displayed, display information indicating that a process of setting a threshold range of a sensing value which is capable of executing the human body touch function is started. Further, the electronic device 100 may output a voice informing that a process of setting a threshold range of a sensing value is started.

Likewise, the electronic device 100 may display the first information 110, and simultaneously or sequentially, output a voice guiding a partial area included in a user's body to be in the first posture with respect to the electronic device 100 by means of a speaker included in the electronic device 100 and the like.

According to the various embodiments, the electronic device 100 may output a remaining period for which the partial area included in the user's body has to maintain a state in the first posture with respect to the electronic device 100 as a voice or a vibration.

When the third information 430 is displayed, the electronic device 100 may likewise output the same contents as the contents of the third information 430 as a voice and provide the output voice to the user.

According to the various embodiments, the electronic device 100 may, instead of displaying information on the display 10, carry out a process of setting a threshold range of a sensing value input through the sensor module by using only a voice guide.

According to the various embodiments, the electronic device 100 may output a remaining period for which the partial area included in the user's body has to maintain the second posture with respect to the electronic device 100 as a voice or a vibration.

According to an embodiment, the electronic device 100 may, in a case in which a distance to the back of the hand 40 or a relative position to the back of the hand 40 is included in the threshold range of the sensing value described above, set the back of the hand 40 as a virtual input area and activate the human body touch function to receive a user input. Accordingly, the user may not carry out an additional operation for the electronic device 100 to activate the human body touch function.

Figure 5A:
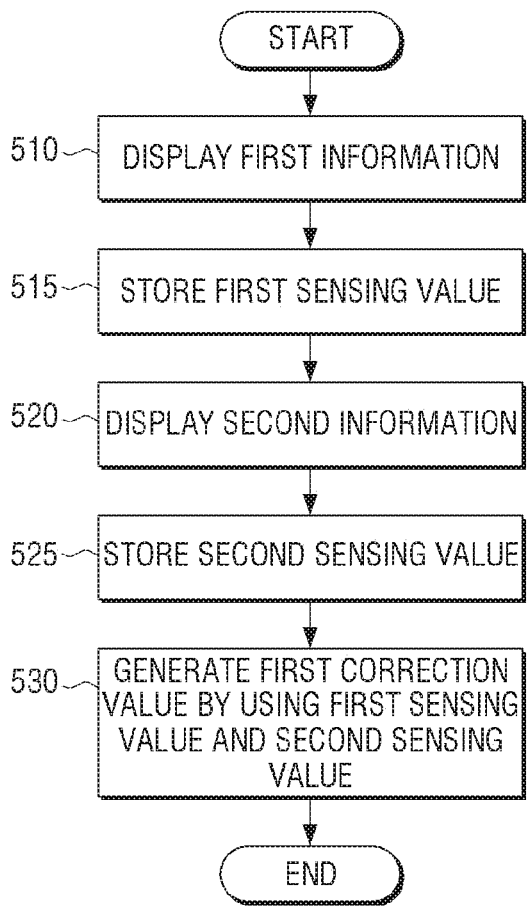
FIGS. 5A and 5B are flowcharts illustrating a situation where an electronic device generates a first correction value and sets a threshold range for executing a human body touch function, according to an embodiment of the disclosure.
Figure 5B:
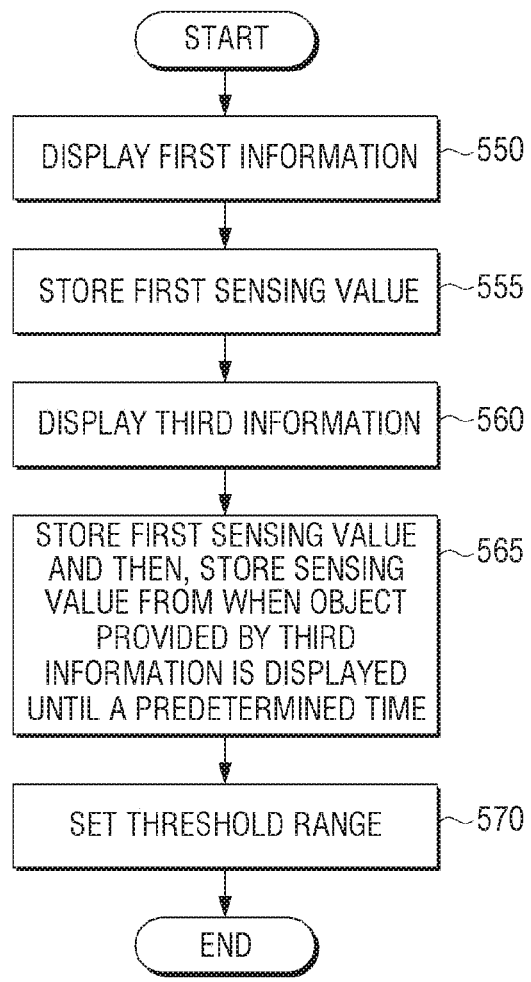

FIGS. 5A and 5B are flowcharts illustrating a situation where an electronic device generates a first correction value and sets a threshold range for executing a human body touch function, according to an embodiment of the disclosure.

FIG. 5A is a flowchart illustrating a situation where the electronic device 100 generates a first correction value, according to an embodiment of the disclosure.

Referring to operation 510, the electronic device 100 may display first information. The first information may, for example, include contents guiding that a portion included in the user's body is in a first posture in relation to the electronic device 100. The first information may, for example, refer to a state in which a surface of the display included in the electronic device 100 and the back of the user's hand are parallel to each other.

The electronic device 100 may, after displaying the first information on the display, display a remaining time for which the back of the hand 40 has to be parallel with the electronic device 100 with a number. The user may maintain a state in which the back of his or her hand is parallel with the display for the remaining time. However, the example is not limited thereto. For example, the electronic device 100 may change a color displayed on the display and notify a time for which the user maintains a state in which the finger on the back of the hand is parallel to the display.

Referring to operation 515, the electronic device 100 may store a first sensing value. The electronic device 100 may store a value from among sensing values received through the sensor module as a first sensing value. For example, in a case in which the sensor module includes a distance measuring sensor, the electronic device 100 may store the highest value from among the distance values detected through the sensor module for a remaining time for which the back of the hand has to be in a parallel state as a first sensing value.

Referring to operation 520, the electronic device 100 may display second information. The second information may, for example, include contents guiding such that a user's finger is positioned at one point of the user's body.

The electronic device 100 may, after displaying the second information on the display, display a remaining time for which a finger is maintained as being positioned on the back of the hand with a number. The user may position the finger on the back of the hand for the remaining time. However, the example is not limited thereto. For example, the electronic device 100 may change a color displayed on the display and notify a time for which the user positions and maintains the finger on the back of the hand.

Referring to operation 525, the electronic device 100 may store a second sensing value. The electronic device 100 may store a value from among sensing values received through the sensor module as a second sensing value. For example, in a case in which the sensor module includes a distance measuring sensor, the electronic device 100 may store the lowest value from among the distance values detected through the sensor module for a remaining time for which the finger has to be positioned on the back of the hand as a second sensing value.

Referring to operation 530, the electronic device 100 may generate a first correction value by using a first sensing value and a second sensing value. For example, the electronic device 100 may generate a difference between the second sensing value and the first sensing value as a first correction value. In addition, the electronic device 100 may, when a user input is detected using a pre-stored first coordinate system, correct an input position of the user by using the first correction value.

FIG. 5B is a flowchart provided to explain a situation where the electronic device 100 according to an embodiment of the disclosure sets a threshold range of a user's body for executing a human body touch function.

Referring to operation 550, the electronic device 100 may display first information. The first information may, for example, include contents guiding that a portion included in the user's body is in a first posture in relation to the electronic device 100. The first information may, for example, refer to a state in which a surface of the display included in the electronic device 100 and the back of the user's hand are parallel to each other.

According to an embodiment, the electronic device 100 may, after displaying the first information 110 on the display 10, display a remaining time for which the back of the hand 40 has to be in a parallel state with the electronic device 100 with a number. The user may maintain a state in which the back of his or her hand is parallel with the display for the remaining time. However, the example is not limited thereto. For example, the electronic device 100 may change a color displayed on the display 10 and notify a time for which the user has to maintain the back of his or her hand in a bent state.

Referring to operation 555, the electronic device 100 may store a first sensing value. The electronic device 100 may store a value from among sensing values received through the sensor module as a first sensing value. For example, in a case in which the sensor module includes a distance measuring sensor, the electronic device 100 may store the largest value from among the distance values detected through the sensor module for a remaining time for which the finger has to be positioned on the back of the hand as a first sensing value.

Referring to operation 560, the electronic device 100 may display third information. The third information may, for example, include contents guiding that the back of the user's hand may be bent closest to the electronic device 100.

The electronic device 100 may, after displaying the third information on the display, display a remaining time for which a wrist has to be maintained in a bent state with a number. The user may maintain the wrist in a bent state for the remaining time. However, the example is not limited thereto. For example, the electronic device 100 may change a color displayed on the display and notify a time for which the user has to maintain his or her wrist in a bent state.

Referring to operation 565, the electronic device 100 may store sensing values input through the sensor module from when the first sensing value is stored until the remaining time for which the wrist has to be in a bent state as a third sensing value. In other words, the electronic device 100 may store sensing values detected through the sensor module from a state in which the back of the hand is parallel to the display of the electronic device 100 to a point in which the back of the hand is closest to the electronic device 100 as a third sensing value.

Referring to operation 570, the electronic device 100 may set a threshold range for executing a human body touch function by using the third sensing value. For example, the electronic device 100 may apply a first correction value to a stored first coordinate system, and set a range from a point on which a distance value is not detected from the back of the hand to a point on which a distance from one point of the back of the hand to the electronic device 100 is 100 mm as a threshold range of a sensing value in which an input position of the user may be detected.

Figure 6A:
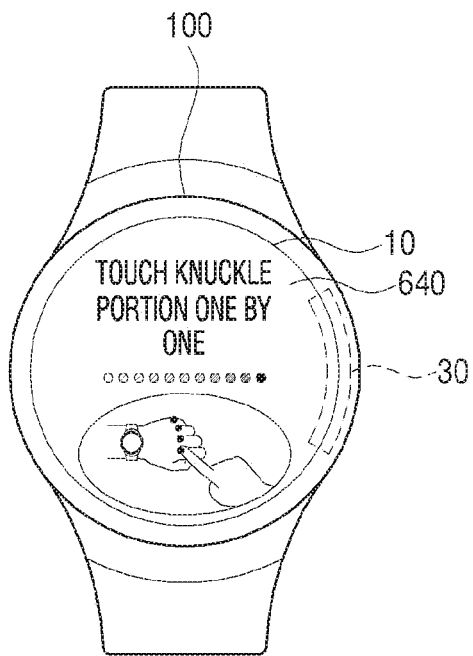
FIGS. 6A and 6B illustrate that an electronic device changes a stored coordinate system to match with a back of a user's hand, according to an embodiment of the disclosure.
Figure 6B:
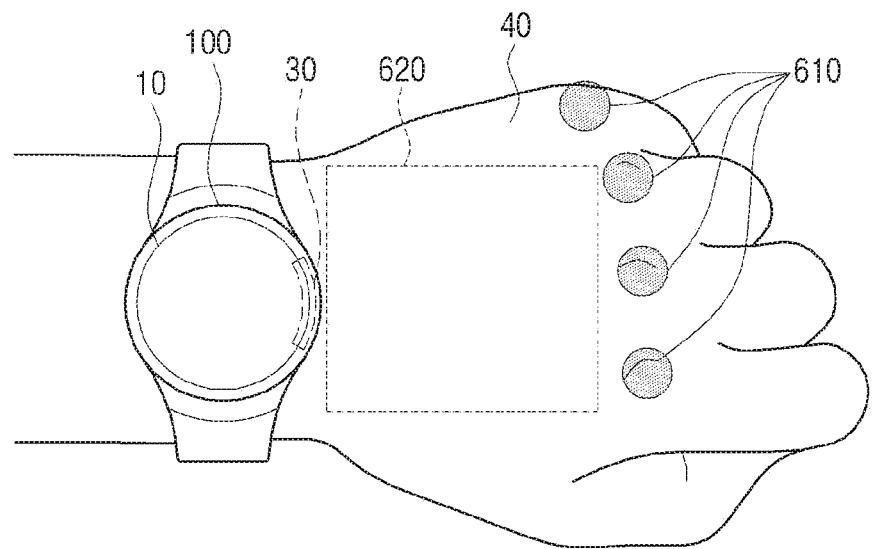

FIGS. 6A and 6B illustrate that an electronic device changes a stored coordinate system to match with a back of a user's hand, according to an embodiment of the disclosure.

For example, the electronic device 100 may carry out the operation as described below, after the operation of FIGS. 1B, 1C, 1D, and 1E is completed.

Referring to FIG. 6A, the electronic device 100 may display fourth information 640 on the display 10. The fourth information 640 may, for example, include contents guiding that an object (e.g., a finger and the like) is sequentially positioned on a plurality of knuckles of the back of the user's hand. A virtual input area 620 may be employed. Virtual input area 620 may be similar to virtual input area 20.

Referring to FIG. 6B, the user may sequentially position a finger on a knuckle 610 of the back of the hand 40 around which the electronic device 100 is worn. In this regard, the electronic device 100 may store sensing values which are detected when the user's finger is positioned on the knuckle 610. For example, the electronic device 100 may, in a state in which the user's finger is positioned on the knuckle 610, store a distance value detected by the sensor module 30 for a predetermined time as a fourth sensing value.

According to the various embodiments, the electronic device 100 may, after displaying the fourth information 640 on the display 10, display a remaining time for which the user has to maintain the finger to be positioned on the knuckle 610 of the back of the hand 40 with a number. However, the example is not limited thereto. For example, the electronic device 100 may change a color displayed on the display 10 and notify a remaining time for which the user has to maintain his or her finger on the knuckle 610. In addition, the electronic device 100 may notify the remaining time to the user through vibration.

According to the various embodiments, the electronic device 100 may display the fourth information 640, and simultaneously or sequentially, output contents included in the fourth information 640 by using a speaker included in the electronic device 100 and the like.

According to the various embodiments, the electronic device 100 may, instead of displaying information on the display 10, output the above-described process using only a voice guide.

According to an embodiment, the electronic device 100, when at least two fourth sensing values are stored, generate a change value to change an area and/or shape of the first coordinate system by using the stored fourth sensing value.

The change value to change the area and/or shape of the first coordinate system may, for example, include a value to change an effective area and/or shape in which a distance to a finger may be effectively recognized using a distance value with respect to the knuckle 610. The electronic device 100 may expand or reduce a size of the first coordinate system by using a change value to change the area and/or the shape, and/or change a shape of the first coordinate system. Accordingly, the electronic device 100 may change a pre-stored first coordinate system to fit the back of the user's hand. According to an embodiment, the electronic device 100 may include a change value to change an area and/or shape of the first coordinate system in the second correction value which will be described later.

According to the various embodiments, with a lineal distance from the knuckle 610 to the sensor module 30 as the axis, the electronic device 100 may detect a change of position of the axis by a curve of the back of the hand 40.

Figures 7A, 7B, 7C:
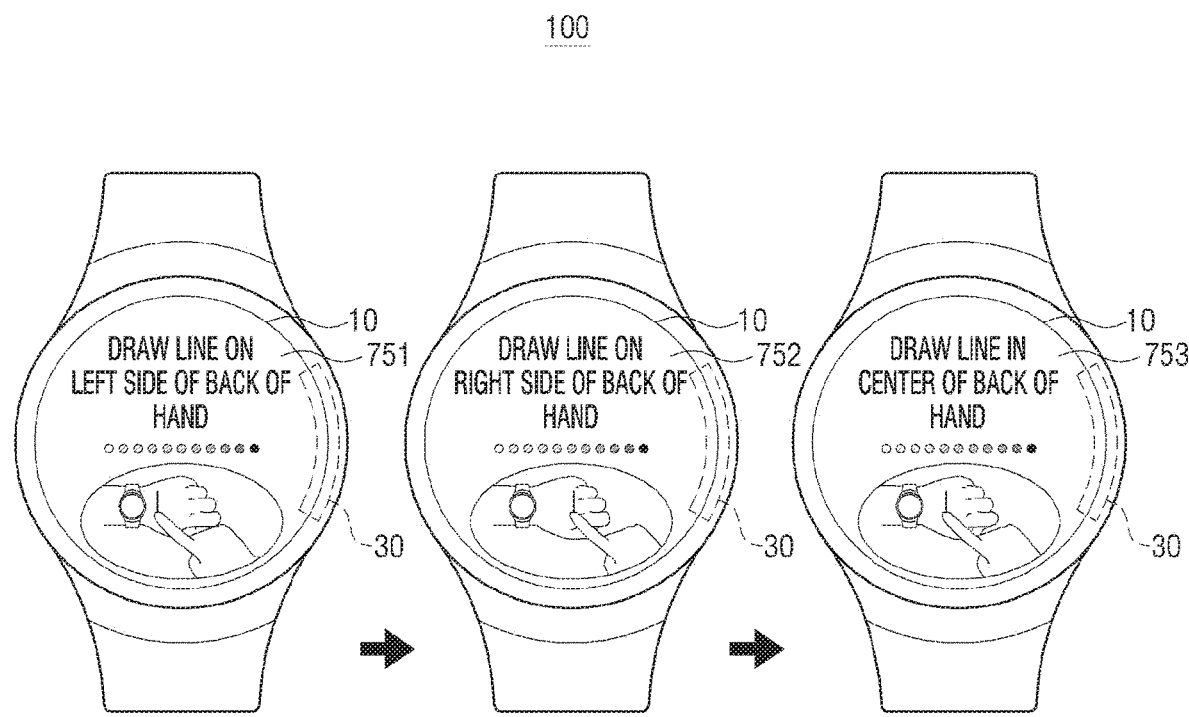
FIGS. 7A, 7B, and 7C illustrate situations where an electronic device includes information relating to a curve of a back of a user's hand in a second correction value, according to an embodiment of the disclosure.

FIGS. 7A, 7B, and 7C illustrates situations where an electronic device includes information relating to a curve of a back of a user's hand in a second correction value, according to an embodiment of the disclosure.

Referring to FIGS. 7A, 7B, and 7C, the electronic device 100 may display fifth information. The fifth information may, for example, include contents guiding that an object (e.g., a finger and the like) is dragged at least once on the back of the user's hand.

According to an embodiment, the electronic device 100 may detect a trajectory that is moved while the user places a finger in contact with the back of the user's hand, and acquire information about a shape of the curve of the back of the hand. Accordingly, the electronic device 100 may set one point on the back of the hand and the other point on the back of the hand so that information about the curve of the back of the hand may be acquired.

The curve of the back of the hand may occur more in a direction from an area adjacent to a little finger toward an area adjacent to a thumb compared with a direction from a wrist toward a finger. Accordingly, the electronic device 100 may select a point of the back of the hand adjacent to the little finger for one point of the back of the hand, and select a point of the back of the hand adjacent to the thumb for the other point of the back of the hand.

According to an embodiment, the electronic device 100 may display a piece of fifth information, and sequentially display a plurality of pieces of fifth information. Accordingly, the electronic device 100 may determine the number of pieces of fifth information to be displayed on the display 10 according to a characteristic (e.g., detection capability, detection range, and the like) of the sensor module 30 included in the electronic device 100 and a surrounding environment (e.g. amount of ambient light and the like) in which the electronic device 100 is disposed.

For example, the electronic device 100 may sequentially display information 5-1 guiding a straight line to be drawn from a first point adjacent to a user's wrist to a second point, information 5-2 guiding a straight line to be drawn from a third point adjacent to an area in which a knuckle of the back of a user's hand is positioned to a fourth point, and information 5-3 guiding a straight line to be drawn from a fifth point of a central portion of the back of the user's hand to a sixth point.

Referring to FIG. 7A, the information 5-1 751 may include contents guiding a line to be drawn close to the wrist of the user. The user may position an object (e.g., a finger and the like) on a first point which is adjacent to a wrist and to a little finger according to the contents of the information 5-1 751, and then move the object toward a second point adjacent to a thumb.

In this regard, the sensor module 30 may detect a moving trajectory of the object according to the guide of the information 5-1 751. In addition, the electronic device 100 may select a moving trajectory detected through the sensor module 30 as a first moving trajectory sensing value and store it.

Referring to FIG. 7B, the information 5-2 752 may include contents guiding a line to be drawn close to an area in which a knuckle of the wrist of the user is positioned. The user may position an object (e.g., a finger and the like) on a third point which is adjacent to a knuckle and to a little finger according to the contents of the information 5-2 752, and then move the object toward a fourth point adjacent to a thumb.

In this regard, the sensor module 30 may detect a moving trajectory of the object according to the guide of the information 5-2 752. In addition, the electronic device 100 may select a moving trajectory detected through the sensor module 30 as a second moving trajectory sensing value and store it.

Referring to FIG. 7C, the information 5-3 753 may include contents guiding a line to be drawn from a central portion of the back of the user's hand. The user may position an object (e.g., a finger and the like) on a fifth point which is adjacent to the central portion of the back of the hand and to a little finger according to the contents of the information 5-3 753, and then move the object toward a sixth point adjacent to a thumb.

In this regard, the sensor module 30 may detect a moving trajectory of the object according to the guide of the information 5-2 753. In addition, the electronic device 100 may select a moving trajectory detected through the sensor module 30 as a third moving trajectory sensing value and store it.

According to the various embodiments, the electronic device 100 may provide information to the user by using an audio output function. For example, the electronic device 100 may output the contents included in the fifth information 751, 752 and 753 as a voice using a speaker included in the electronic device 100 and the like. According to the various embodiments, the electronic device 100 may, instead of displaying information on the display 10, carry out the above-described process using only a voice guide.

According to an embodiment, the electronic device 100 may acquire information about a curve of the back of the user's hand by using at least one of the first moving trajectory sensing value, the second moving trajectory sensing value and the third moving trajectory sensing value which are collected through the above-described process. The electronic device 100 may include acquired information about a curve of the back of the user's hand in a second correction value and apply it to a first coordinate system.

That is, the second correction value may, for example, include a change value according to a size and shape of the back of the hand based on a distance from the knuckle and information according to a curve of the back of the hand. According to an embodiment, the electronic device 100 may apply the first correction value and the second correction value to the first coordinate system and generate a second coordinate system.

The processes of FIGS. 6A, 6B, 7A, 7B, and 7C may be carried out as a registration process for a human body touch function in the case where the electronic device 100 executes the human body touch function for the first time. Accordingly, the electronic device 100 may display information indicating that a process of acquiring a second correction value is started, before the fourth information 640 is displayed.

FIGS. 8A, 8B, and 8C illustrate situations where an electronic device derives information according to a curve of a back of a hand, according to an embodiment of the disclosure.

Referring to FIG. 8A, the electronic device 100 may display fifth information 850 guiding a straight line to be drawn on the back of the hand by using an object (e.g., a finger and the like) on the display 10. The user may position an object (e.g., a finger and the like) on a point on the back of the hand which is adjacent to a little finger according to the contents of the object, and then move the object toward the other point adjacent to a thumb.

According to an embodiment, an x-axis may refer to a direction perpendicular to a direction from a user's wrist to a user's finger. The z-axis may refer to a distance from the sensor module 30 of the electronic device 100 to an object (e.g., a finger and the like).

According to an embodiment, the electronic device 100 may detect a trajectory along an object is moved, by using the sensor module 30. The electronic device 100 may acquire various feature information related to a curve of the back of the hand from a trajectory formed according to the curve of the back of the hand.

For example, the electronic device 100 may acquire information about a position (e.g., a coordinate value) of a trajectory on the back of the hand, a shape of the trajectory, a curvature of a curved portion included in the trajectory, a direction of progress of the trajectory, a position of an inflection point included in the trajectory, and the like. In other words, the electronic device 100 may acquire feature information related to a curve of the back of the hand from modification information of the back of the hand according to a movement of the object.

For example, the electronic device 100 may, when a movement of a finger as illustrated in FIG. 8A is detected, detect that a position at which a trajectory by the movement of the finger is generated is a central portion of the back of the hand and that a progress direction of the trajectory is moved in a "−" direction along the x-axis. In addition, the electronic device 100 may acquire feature information related to a curve of the back of the hand, such as the number of inflection points of the trajectory, a modification curvature, a position of a modified axis, and the like, using the detected trajectory information.

Referring to FIG. 8B, the electronic device 100 may convert a moving trajectory of an object (e.g., a finger and the like) detected using the sensor module 30 into a XZ coordinate system and express it. In general, in the case of the back of a hand, a virtual line that connects a knuckle of a middle finger to a wrist may be formed to be higher than a peripheral portion. Accordingly, a distance value (z-axis) from the electronic device 100 to an object (e.g., a finger and the like) may be reduced and then increased along the x-axis.

The electronic device 100 may, in a state in which the trajectory is converted into a XZ coordinate system, derive a value that changes a trajectory expressed in a curved line to a straight line as a change value according to a curve of the back of the hand, and may include the derived value in a second correction value. In this regard, a change value according to the curve of the back of the hand may correspond to information about the curve of the user's hand which is described with reference to FIGS. 7A, 7B, and 7C.

The change value according to the curve of the back of the hand may, provided with a virtual straight line which includes an inflection point included in a curved line and is parallel to the x-axis, in the case where the curved line is projected onto the virtual straight line, correspond to a distance the points included in the curved line moves to the virtual straight line.

However, the example is not limited thereto. For example, the electronic device 100 may, provided with a virtual straight line which includes the opposite end points of a curved line and is parallel to the x-axis, in the case where the curved line is projected onto the virtual straight line, correspond to a distance the points included in the curved line moves to the virtual straight line. That is, the electronic device 100 according to an embodiment may use a variety of methods to project a curved line onto a straight line and change it. That is, the electronic device 100 according to an embodiment may use a variety of methods to project a curved line onto a straight line and change it.

Referring to FIG. 8C, using a change value according to a curve of the back of the hand to change a trajectory drawn as a curved line to a straight line by reflecting a curve feature of the back of the hand, the electronic device 100 may change the trajectory of the curve to a straight line.

The electronic device 100 according to an embodiment may generate a second coordinate system that is fitted to a curve of the user's hand by applying a first correction value described with reference to FIGS. 1B, 1C, 1D, and 1E and a second correction value described with reference to FIGS. 6A to 8C to the first coordinate system stored by the manufacturer. Accordingly, the electronic device 100 may recognize, without error, a contact position of an object (e.g., a finger and the like) and a drag operation and direction of the object in a curved virtual input area (e.g., the back of a hand).

FIGS. 9A, 9B-1, 9B-2, 9C-1, 9C-2, 9D-1, and 9D-2 illustrate situations where an electronic device generates feature information relating to a curvature from a trajectory drawn on a back of a hand, according to an embodiment of the disclosure.

Figures 1, 2, 9A, 9B, 9C, 9D:
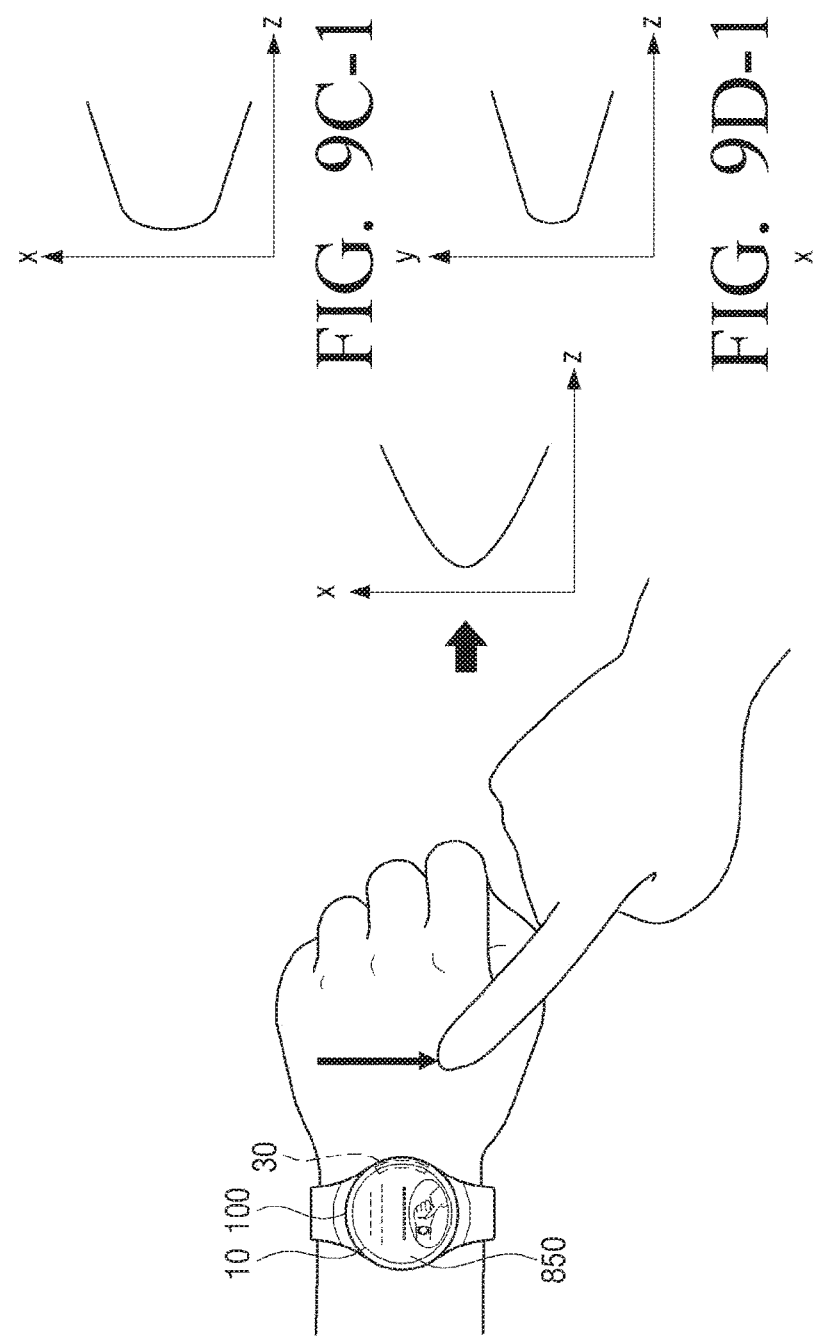
FIGS. 9A, 9B-1, 9B-2, 9C-1, 9C-2, 9D-1, and 9D-2 illustrate situations where an electronic device generates feature information relating to a curvature from a trajectory drawn on a back of a hand, according to an embodiment of the disclosure.

Referring to FIG. 9A, the electronic device 100 may display fifth information 850 guiding an object (e.g., a finger and the like) to draw a straight line on the back of the hand on the display 10. The user may position an object (e.g., a finger and the like) on a point on the back of the hand which is adjacent to a little finger according to the contents of the fifth information 850, and then move the object toward the other point adjacent to a thumb.

According to an embodiment, the electronic device 100 may detect a trajectory along which the object is moved, by using the sensor module 30. The electronic device 100 may change a trajectory formed along a curve of the back of the hand to a two-dimensional curved line and expresses it on a XZ coordinate system, and acquire information about a curvature of the curved line and acquire information about a curvature of the back of the hand. The x-axis may refer to a direction perpendicular to a direction from a user's wrist to a user's finger. The z-axis may refer to a distance from the sensor module 30 of the electronic device 100 to an object.

FIGS. 9B-1, 9B-2, 9C-1, 9C-2, 9D-1, and 9D-2 are diagrams visually representing a two-dimensional curve derived by the electronic device 100 and a size of a curvature of the two dimensional curved line.

For example, FIGS. 9B-1, 9C-1, and 9D-1 are diagrams illustrating a moving trajectory of an object (e.g., a finger and the like) is expressed as a two-dimensional curved line on a XZ coordinate system as illustrated in FIG. 9A. FIGS. 9B-2, 9C-2, and 9D-2 are diagrams visually representing a curvature of a two-dimensional curved line. For example, the larger the area indicated by the dark color, the smaller the curvature, and the narrower the area indicated by the darker color, the larger the curvature.

Referring to FIGS. 9B-1, 9B-2, 9C-1, 9C-2, 9D-1, and 9D-2, the electronic device 100 may differently determine a change value according to a curve of the back of the hand based on a curvature and progress direction of the curved line. For example, a section that needs to be corrected to a straight line from among a trajectory expressed as a curved line may be selected as a first section (A), and a section for which correction is unnecessary may be selected as a second section (B).

Comparing the curved line of FIG. 9B-1 with that of FIG. 9C-1, a curvature of the curved line of FIG. 9B-1 is less than that of the curved line of FIG. 9C-1. Accordingly, a first section (A) of FIG. 9B-2 may be formed to be longer than a first section (A) of FIG. 9C-2.

Referring to FIG. 9D-1, a curved line based on a moving trajectory of an object (e.g., a finger and the like) may include two inflection points. In this regard, the electronic device 100 may determine the first section (A) and the second section (B) by using each of the inflection points and each of the curvatures.

FIGS. 10A-1, 10A-2, and 10B illustrate situations where an electronic device changes feature information when a trajectory drawn on a back of a hand is moved, according to an embodiment of the disclosure.

As described above, the electronic device 100 may generate a first correction value and a second correction value and apply them when an input of a user's touch is received, in order to reduce a touch recognition error that may occur when a human body touch function is executed.

According to the various embodiments, there may be a case where the electronic device 100 regenerates or modifies a change value according to a curve of the back of the hand that corrects a trajectory expressed in a curved line to a straight line. For example, when the human body touch function is executed, a curve of the back of the user's hand may be changed.

Figures 1, 10A:
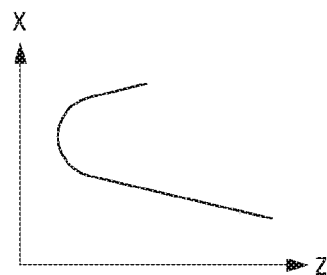
Figures 2, 10A:
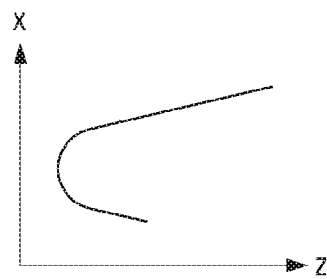

Referring to FIG. 10A-1, the electronic device 100 may detect a trajectory along which an object (e.g., a finger and the like) is moved on the back of the user's hand using a sensor module, and convert the trajectory to a XZ coordinate system and express it. The electronic device 100 may convert the moving trajectory of the object to a XZ coordinate system and express it. The electronic device 100 may acquire a change value according to a curve of the back of the hand which corrects a trajectory expressed as a curved line when converted to the XZ coordinate system to a straight line.

The above-described process may be carried out when the electronic device 100 provides a user interface as described with reference to FIGS. 7A, 7B, and 7C in the case where the human touch function is executed for the first time. According to an embodiment, the electronic device 100 may, while the human body touch function is executed, when a trajectory along an object (e.g., a finger and the like) is moved on the back of the user's hand is detected, regenerate or modify a change value according to a curve of the back of the hand based on the changed trajectory.

Referring to FIG. 10A-2, the electronic device 100 may detect a trajectory along which an object (e.g., a finger and the like) is moved on the back of the user's hand using a sensor module, and convert the trajectory to a XZ coordinate system and express it. The electronic device 100 may regenerate or modify a change value according to a curve of the back of the hand according to the changed moving trajectory.

Figure 10B:
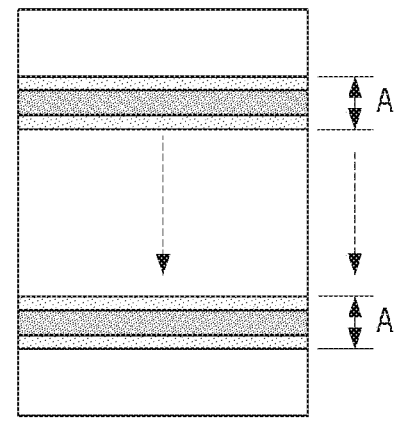

Referring to FIG. 10B, a position of a first section (A) in which it is necessary to make correction to a straight line may be changed according to the changed moving trajectory. The electronic device 100 may regenerate or modify a change value according to a curve of the back of the hand to fit the changed position of the first section (A).

Accordingly, the electronic device 100 may, when a state of the back of the hand using the human body touch function is changed, modify a change value according to a curve of the back of the hand based on the changed state.

Figure 11:
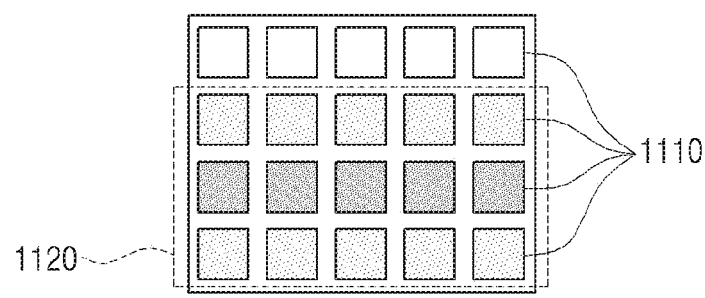
FIG. 11 illustrates situations where an electronic device acquires, using a curvature of a back of a hand generated by positions of knuckles, a change according to the curvature of the back of a hand, according to an embodiment of the disclosure.

FIG. 11 illustrates situations where an electronic device acquires, using a curvature of a back of a hand generated by positions of knuckles, a change according to the curvature of the back of a hand, according to an embodiment of the disclosure.

Referring to FIG. 11, the electronic device 100 may divide the back of a hand into a plurality of areas.

For example, the electronic device 100 may divide the back of the hand into a plurality of areas based on knuckles included in each finger. Four areas 1110 in the vertical direction may be an area adjacent to each knuckle of the back of the hand. The areas disposed to be adjacent to the four areas 1110 may be areas sequentially disposed according to a curve generated by a knuckle.

According to an embodiment, as the color of each of the areas becomes darker, the area may be an area adjacent to an inflection point generated based on a trajectory of a finger drawn on the back of the hand. The electronic device 100 may determine a section 1120 to be corrected to a straight line and generate a change value according to a curve of the back of the hand.

Figure 12:
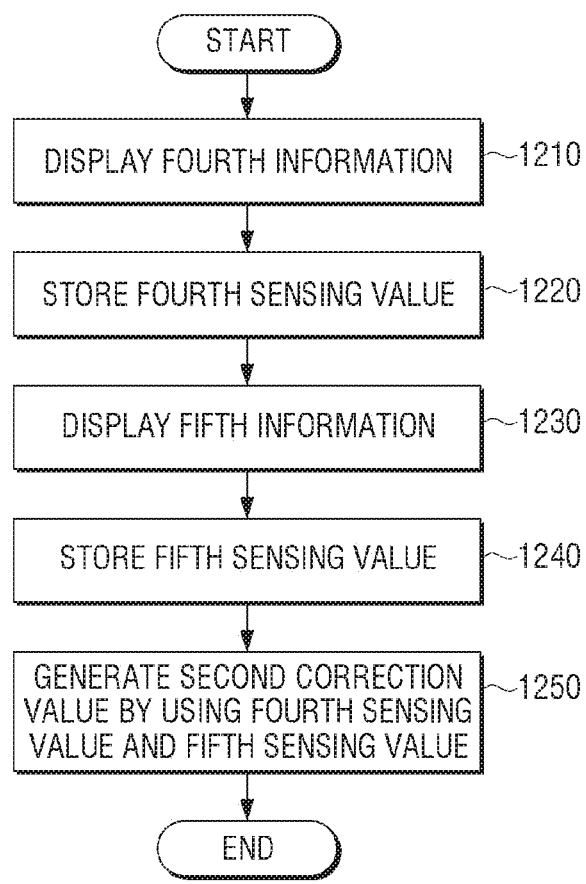
FIG. 12 is a flowchart illustrating a situation where an electronic device generates a second correction value, according to an embodiment of the disclosure.

FIG. 12 is a flowchart illustrating a situation where an electronic device generates a second correction value, according to an embodiment of the disclosure.

Referring to operation 1210, the electronic device 100 may display fourth information. The fourth information may, for example, include contents guiding that an object (e.g., a finger and the like) is sequentially positioned on a plurality of knuckles of the back of the user's hand.

According to an embodiment, the electronic device 100 may, after displaying the fourth information, display a remaining time for which the user has to maintain a finger to touch each knuckle with a number. However, the example is not limited thereto. For example, the electronic device 100 may notify the remaining time to the user through vibration or sound.

Referring to operation 1220, the electronic device 100 may store a fourth sensing value. The electronic device 100 may, after the fourth information is displayed, store at least one value from among sensing values detected through the sensor module as a fourth sensing value.

For example, in a case in which the sensor module includes a distance measuring sensor, the electronic device 100 may store the largest value from among the distance values detected through the sensor module for a remaining time for which the finger has to touch a knuckle as a fourth sensing value. The electronic device 100 may sequentially carry out such operation with respect to each of the knuckles.

Referring to operation 1230, the electronic device 100 may display fifth information. The fifth information may, for example, include contents guiding that an object (e.g., a finger and the like) touches one point of the back of the user's hand and then that the object is moved as if a line was drawn to the other point.

According to the various embodiments, the electronic device 100 may provide information to the user by using an audio output function. For example, the electronic device 100 may output the contents included in the fifth information as a voice using a speaker included in the electronic device 100 and the like. According to the various embodiments, the electronic device 100 may, instead of displaying information on the display, carry out the above-described process using only a voice guide.

According to an embodiment, the electronic device 100 may detect a trajectory that is moved while the user places a finger in contact with the back of the user's hand, and acquire information about a shape of the curve of the back of the hand. Accordingly, the electronic device 100 may set one point on the back of the hand and the other point on the back of the hand so that information about the curve of the back of the hand may be acquired.

According to an embodiment, the electronic device 100 may display a piece of fifth information, and sequentially display a plurality of pieces of fifth information. For example, the electronic device 100 may sequentially display information 5-1 guiding a straight line to be drawn adjacently to a user's wrist, information 5-2 guiding a straight line to be drawn adjacently to an area in which a knuckle of the back of a user's hand is positioned, and information 5-3 guiding a straight line to be drawn in a central portion of the back of the user's hand.

Referring to operation 1240, the electronic device 100 may store a fifth sensing value. The electronic device 100 may, after the fifth information is displayed, store a value from among sensing values received through the sensor module as a fifth sensing value.

Referring to operation 1250, the electronic device 100 may generate a second correction value by using the fourth sensing value and the fifth sensing value. That is, the second correction value may, for example, include a change value according to a size and shape of the back of the hand based on a distance from the knuckle and information according to a curve of the back of the hand. According to the various embodiments, the electronic device 100 may apply the first correction value and the second correction value to the first coordinate system and generate a second coordinate system.

Figure 13:
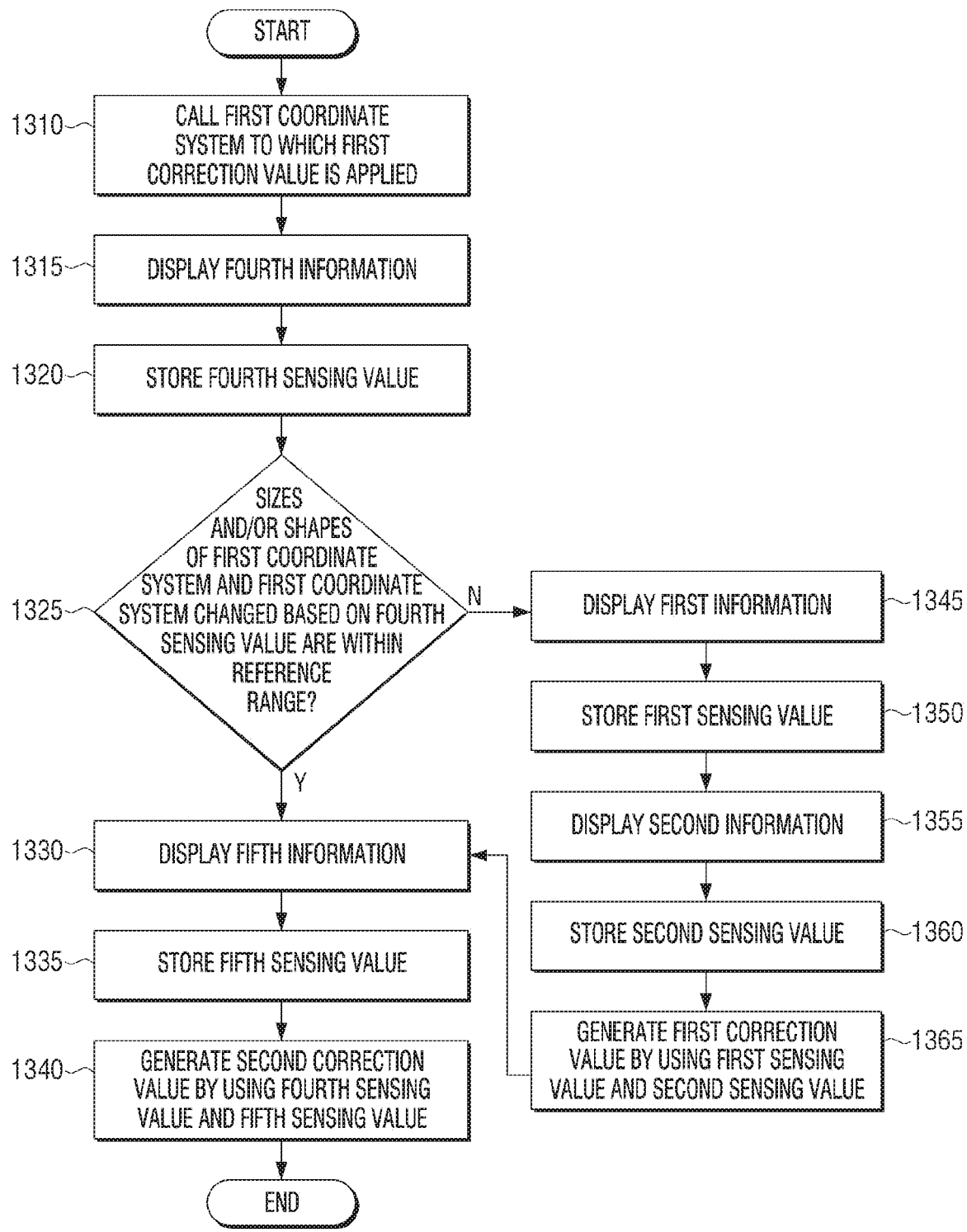
FIG. 13 is a flowchart illustrating a situation where an electronic device generates a second correction value after modifying a first correction value, according to various embodiments of the disclosure.

FIG. 13 is a flowchart illustrating a situation where an electronic device generates a second correction value after modifying a first correction value, according to various embodiments of the disclosure.

Referring to operation 1310, the electronic device 100 may call a first coordinate system to which the first correction value is applied. The electronic device 100 may, for example, derive a first correction value by using a difference between a sensing value when an object (e.g., a finger and the like) is detected in a virtual input area (e.g., the back of the user's hand and the like) and a sensing value when an object is not detected.

Referring to operation 1315, the electronic device 100 may display fourth information. The fourth information 640 may, for example, include contents guiding that an object (e.g., a finger and the like) is sequentially positioned on a plurality of knuckles of the back of the user's hand.

Referring to operation 1320, the electronic device 100 may store a fourth sensing value. For example, in a case in which the sensor module includes a distance measuring sensor, the electronic device 100 may store the largest value from among the distance values detected through the sensor module for a remaining time for which the finger has to touch a knuckle as a fourth sensing value. The electronic device 100 may sequentially carry out such operation with respect to each of the knuckles.

Referring to operation 1325, the electronic device 100 may compare whether a size and/or shape of a first coordinate system and a size and/or shape of a first coordinate system to which the fourth sensing value is applied is within a predetermined range. For example, when an area of the first coordinate system and an area of the changed coordinate system are different by more than 100 $mm^2$ or an area of an area not overlapping between the first coordinate system and the changed coordinate system is different by more than 100 $mm^2$, it may be determined that a predetermined range is exceeded.

Referring to operation 1325, when a size and/or shape of the first coordinate system and a size and/or shape of the first coordinate system to which the fourth sensing value are within a predetermined range, the electronic device 100 may display fifth information. The fifth information may, for example, include contents guiding that an object (e.g., a finger and the like) touches one point of the back of the user's hand and then that the object is moved as if a line was drawn to the other point.

Referring to operation 1335, the electronic device 100 may store a fifth sensing value. The electronic device 100 may, after the fifth information is displayed, store a value from among sensing values received through the sensor module as a fifth sensing value.

Referring to operation 1340, the electronic device 100 may generate a second correction value by using the fourth sensing value and the fifth sensing value. That is, the second correction value may, for example, include a change value according to a size and shape of the back of the hand based on a distance from the knuckle and information according to a curve of the back of the hand.

Referring to operation 1345, when a size and/or shape of the first coordinate system and a size and/or shape of the first coordinate system to which the fourth sensing value exceed a predetermined range, the electronic device 100 may display first information. The first information may, for example, refer to a state in which a surface of the display included in the electronic device 100 and the back of the user's hand are parallel to each other. That is, the electronic device 100 may carry out an operation for regenerating a first correction value.

Referring to operation 1350, the electronic device 100 may store a first sensing value. For example, in a case in which the sensor module includes a distance measuring sensor, the electronic device 100 may store the highest value from among the distance values detected through the sensor module for a remaining time for which the back of the hand has to be in a parallel state as a first sensing value.

Referring to operation 1355, the electronic device 100 may display second information. The second information may, for example, include contents guiding such that a user's finger is positioned at one point of the user's body.

Referring to operation 1360, the electronic device 100 may store a second sensing value. For example, in a case in which the sensor module includes a distance measuring sensor, the electronic device 100 may store the lowest value from among the distance values detected through the sensor module while the finger has to be positioned on the back of the hand as a second sensing value.

Referring to operation 1365, the electronic device 100 may generate a first correction value by using a first sensing value and a second sensing value.

According to an embodiment, the electronic device 100 may regenerate a first correction value and then, proceed with operation 1330 to generate a second correction value. Accordingly, the electronic device 100 may update a second coordinate system generated by applying the first correction value and the second correction value to the first coordinate system, and minimize malfunction that occurs when a user input is received.

Figure 14:
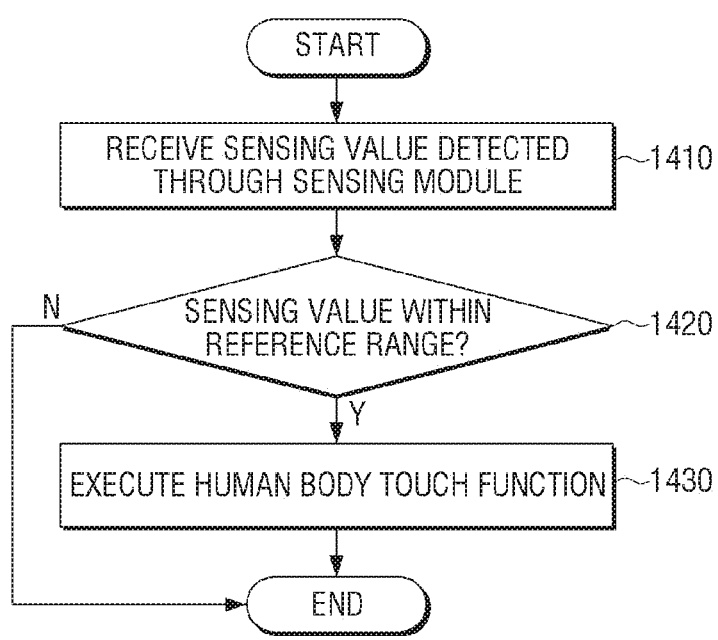
FIG. 14 is a flowchart illustrating a situation where an electronic device determines whether to execute a human body touch function, according to various embodiments of the disclosure.

FIG. 14 is a flowchart illustrating a situation where an electronic device determines whether to execute a human body touch function, according to various embodiments of the disclosure.

Referring to operation 1410, the electronic device 100 may receive a sensing value detected through a sensor module. For example, the electronic device 100 may receive a sensing value detected from a virtual input area (e.g., the back of a hand) by using a sensor module including a distance measuring sensor.

Referring to operation 1420, the electronic device 100 may compare whether the sensing value is included in a predetermined range. For example, the electronic device 100 may, when an area occupied by an object (e.g., a finger and the like) is within 1% to 3% of an area of a virtual input area (e.g., the back of a hand) which may be detected by a sensor module, determine that it is a user input for executing a human body touch function.

In addition, the electronic device 100 may, when an area occupied by the object (e.g., a finger and the like) exceeds 3% of an area of a virtual input area (e.g., the back of a hand) which may be detected by the sensor module, determine that it is not a user input for executing a human body touch function.

Referring to operation 1430, the electronic device 100 may, when it is determined that the detected sensing value is a user input for executing a human body touch function, execute the human body touch function.

Figure 15A:
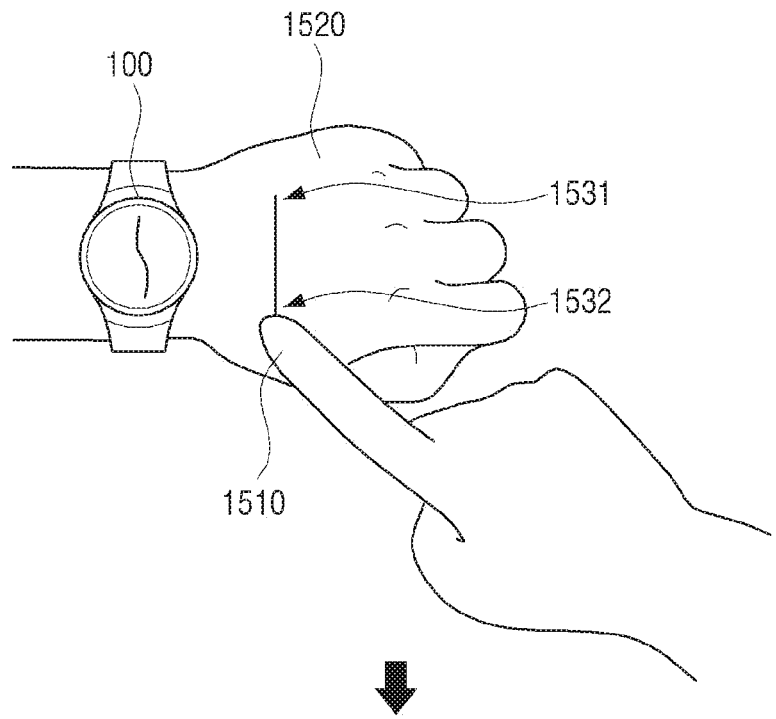
FIGS. 15A and 15B are diagrams illustrating situations where an electronic device detects a user input in a virtual input area, according to an embodiment of the disclosure.
Figure 15B:
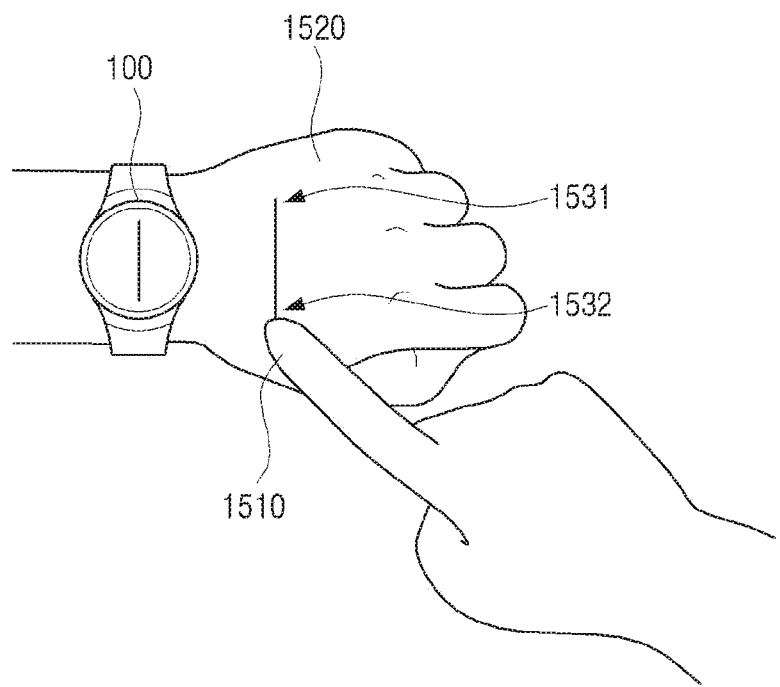

FIGS. 15A and 15B are diagrams illustrating situations where an electronic device detects a user input in a virtual input area, according to an embodiment of the disclosure.

The electronic device 100 may generate a second coordinate system by applying the second correction value described above to a first coordinate system stored by the manufacturer. Accordingly, the electronic device 100 may accurately detect a movement of the object (e.g., a finger and the like) in a virtual input area (e.g., the back of the hand). In a case in which the detected moving trajectory is in a letter shape, the electronic device 100 may extract a feature point of the handwriting.

Referring to FIGS. 15A and 15B, the electronic device 100 may detect that a finger 1510 is moved from one point 1531 of the back of the hand 1520 to another point 1532 of the back of the hand 1520.

In the case of FIG. 15A, it may be a state in which the electronic device 100 has not generated a second correction value including a value that corrects a curve of the back of the hand. The user may move the finger 1510 on the back of the hand 1520 in the form of a straight line. The electronic device 100 may detect a movement of the finger 1510. The finger 1510 is moved in a straight line, but the electronic device 100 may detect that it is a different input (e.g., a curved line) from a user's intention by reflecting a curve of the back of the hand.

In the case of FIG. 15B, it may be a state in which the electronic device 100 according to an embodiment has generated a second correction value including a value that corrects a curve of the back of the hand and applied the generated second correction value to the first coordinate system. The user may move the finger 1510 on the back of the hand 1520 in the form of a straight line. The electronic device 100 may detect a movement of the finger 1510. The finger 1510 is moved in a straight line, and the electronic device 100 may detect the movement of the finger 1510 as a straight line movement by using a correction value for the curve of the back of the hand. Accordingly, the electronic device 100 may carry out an input that fits a user's intention.

Figure 16A:
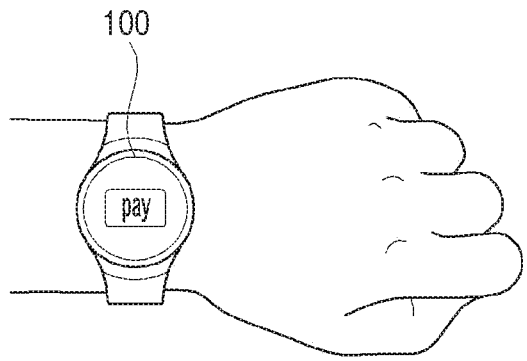
FIGS. 16A, 16B, and 16C are diagrams illustrating situations where a user progresses an electronic payment by using a virtual input area in an electronic device, according to an embodiment of the disclosure.
Figure 16B:
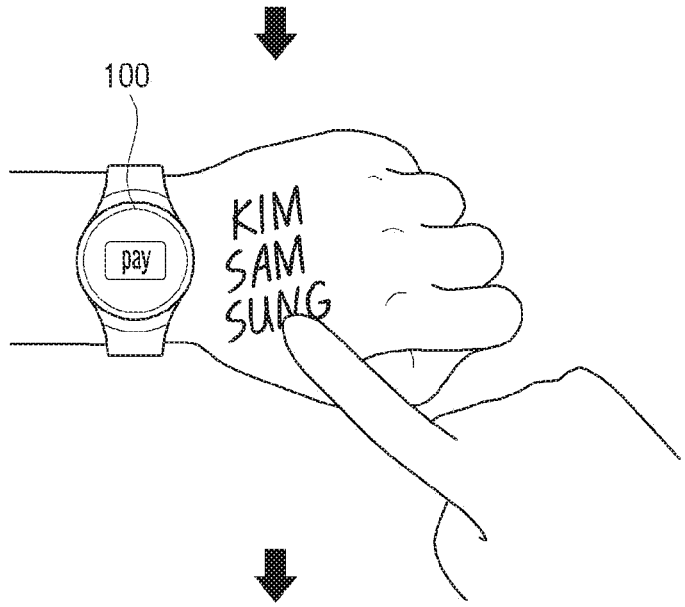
Figure 16C:
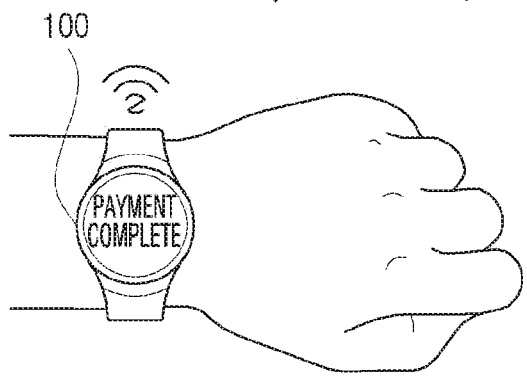

FIGS. 16A, 16B, and 16C are diagrams illustrating situations where a user progresses an electronic payment by using a virtual input area in an electronic device, according to an embodiment of the disclosure.

Referring to FIG. 16A, the electronic device 100 may carry out an application which is capable of carrying out payment. The application which is capable of carrying out payment may, for example, include a Samsung Pay application).

Referring to FIG. 16B, the electronic device 100 may request a user's authentication to carry out payment. The user may, for example, carry out a user's authentication using a fingerprint recognition or a pin number.

According to an embodiment, the electronic device 100 may carry out a user's authentication by signing on a virtual input area (e.g., the back of the hand). For example, the electronic device 100 may carry out a user's authentication by comparing a stored sign received in advance with a trajectory input to a virtual input area.

Referring to FIG. 16C, the electronic device 100 may carry out an electronic payment using a near field communication (NFC) method, such as NFC, a magnetic stripe transmission (MST), Bluetooth, and the like).

Figure 17:
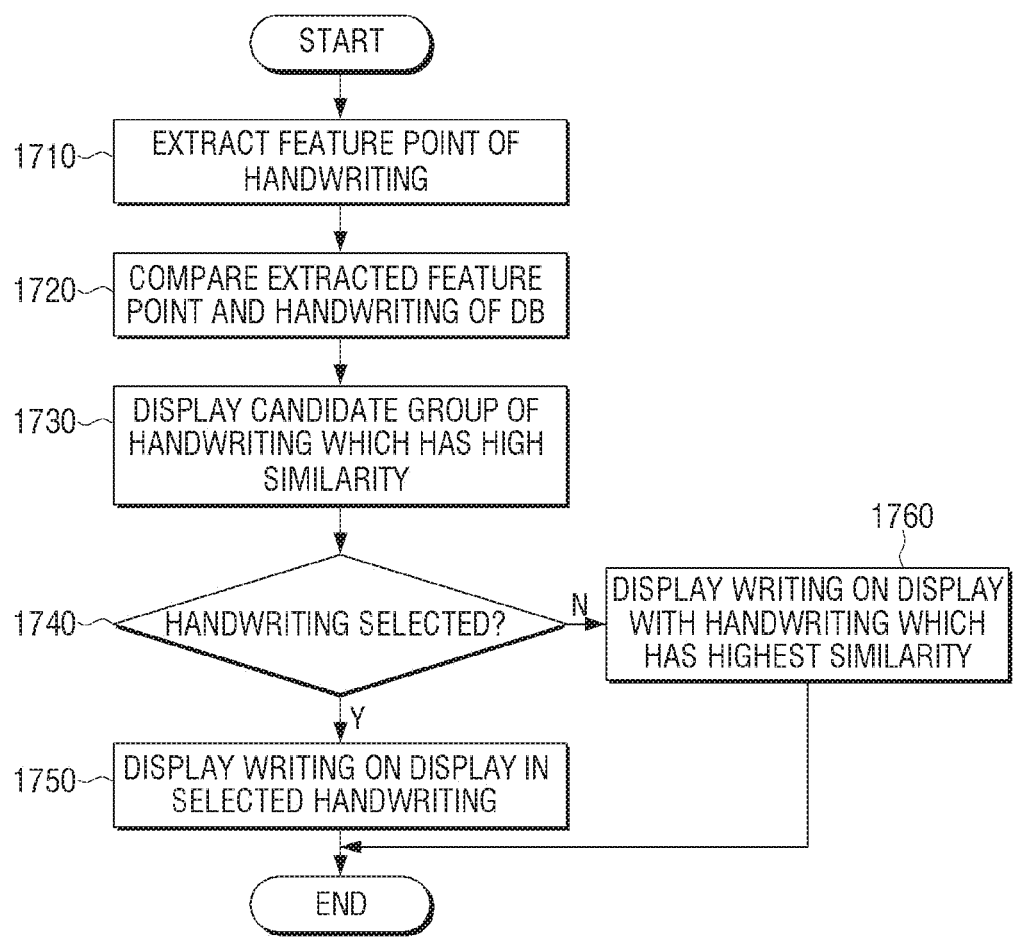
FIG. 17 is a flowchart of a situation where an electronic device receives an input of a handwriting by using a virtual input area and displays the handwriting on a display, according to an embodiment of the disclosure.

FIG. 17 is a flowchart of a situation where an electronic device receives an input of a handwriting by using a virtual input area and displays the handwriting on a display, according to an embodiment of the disclosure.

Referring to operation 1710, the electronic device 100 may detect a feature point of a handwriting. For example, the electronic device 100 may detect a movement of an object (e.g., a finger and the like) in a virtual input area (e.g., the back of a hand) and convert it into a phrase. In a case in which the detected moving trajectory is in a letter shape, the electronic device 100 may extract a feature point of the handwriting. In a case in which the detected moving trajectory is in a letter shape, the electronic device 100 may extract a feature point of the handwriting. The feature point of the handwriting may be, for example, associated with a shape and position of a consonant and a vowel.

Referring to operation 1720, the electronic device 100 may compare the extracted feature point with a stored handwriting.

Referring to operation 1730, the electronic device 100 may, as a result of comparison, select a candidate group of handwritings which are highly similar to each other, and display the selected candidate group.

Referring to operation 1740, the electronic device 100 may identify a user input to select one of the displayed handwritings.

Referring to operation 1750, the electronic device 100 may, when a user input to select at least one handwriting is identified, display a trajectory input on the back of the hand by the user by using the selected handwriting.

Referring to operation 1760, the electronic device 100 may, when a user input to select at least one handwriting is not identified, select a handwriting which is most similar to each other. The electronic device 100 may display a trajectory input by the user on the back of the hand by using the selected handwriting.

Figure 18:
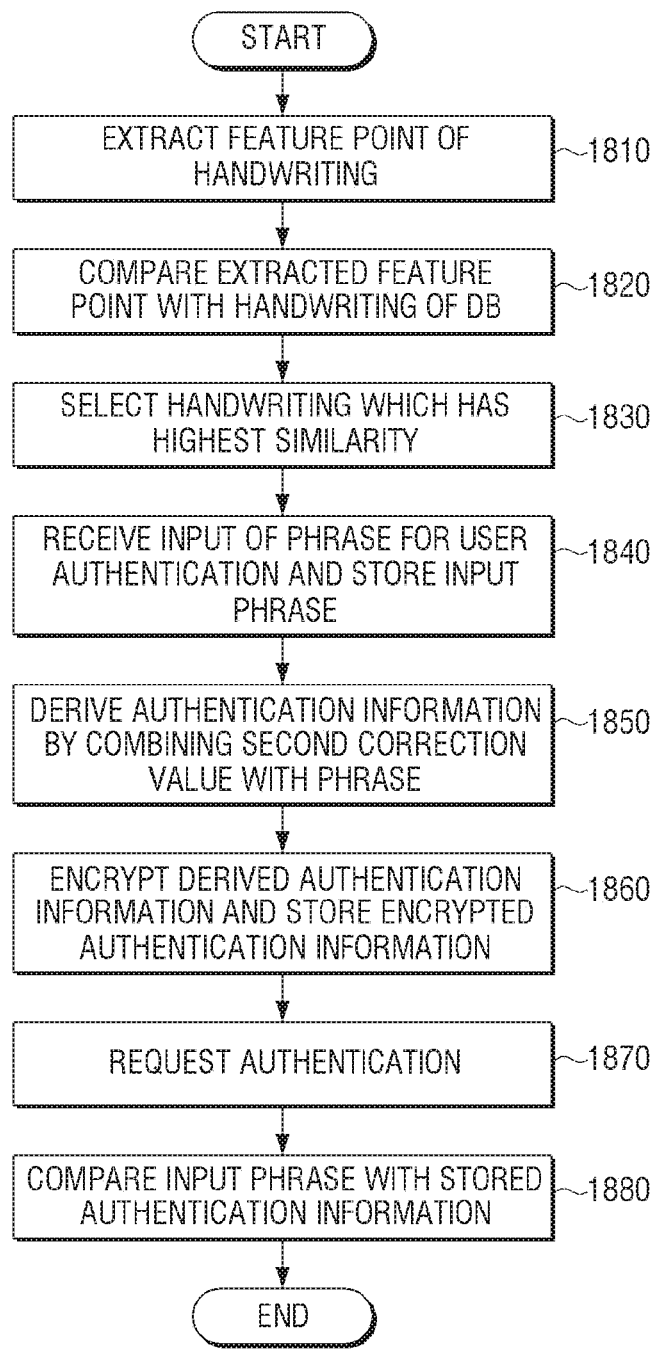
FIG. 18 is a flowchart of a situation where an electronic device receives an input of a handwriting by using a virtual input area and encrypts the handwriting for user certification, according to an embodiment of the disclosure.

FIG. 18 is a flowchart of a situation where an electronic device receives an input of a handwriting by using a virtual input area and encrypts the handwriting for user certification, according to an embodiment of the disclosure.

Referring to operation 1810, the electronic device 100 may detect a feature point of a handwriting. For example, the electronic device 100 may detect a movement of an object (e.g., a finger and the like) in a virtual input area (e.g., the back of a hand) and convert it into a phrase. In a case in which the detected moving trajectory is in a letter shape, the electronic device 100 may extract a feature point of the handwriting. In a case in which the detected moving trajectory is in a letter shape, the electronic device 100 may extract a feature point of the handwriting. The feature point of the handwriting may be, for example, associated with a shape and position of a consonant and a vowel.

Referring to operation 1820, the electronic device 100 may compare the extracted feature point with a stored handwriting.

Referring to operation 1830, the electronic device 100 may select a handwriting which is most similar to each other.

Referring to operation 1840, the electronic device 100 may receive a phrase for user's authentication and store the received phrase. For example, the electronic device 100 may execute a payment application and, when a user's authentication is carried out, receive a phrase which may be used. To this end, the electronic device 100 may detect a moving trajectory of the object (e.g., a finger and the like), convert the detected moving trajectory, and store the converted moving trajectory.

Referring to operation 1850, the electronic device 100 may derive authentication information by combining a second correction value with the phrase. For example, the electronic device 100 may derive authentication information by combining a moving trajectory of an object (e.g., a finger and the like) converted into a letter with information relating to a curve of the back of the hand included in the second correction value.

Referring to operation 1860, the electronic device 100 may encrypt the derived authentication information and store encrypted authentication information.

Referring to operation 1870, the electronic device 100 may request a user's authentication. For example, the electronic device 100 may, when a payment application is executed, display a user interface requesting a user's authentication before proceeding with payment.

Referring to operation 1880, the electronic device 100 may compare the input phrase with stored authentication information. For example, the electronic device 100 may detect a movement of an object (e.g., a finger and the like) in a virtual input area (e.g., the back of a hand) and convert it into a phrase. In a case in which the detected moving trajectory is in a letter shape, the electronic device 100 may extract a feature point of the handwriting. The electronic device 100 may carry out a user's authentication by comparing the converted phrase and a correction value applied to a movement of the object with the stored authentication information.

The term "module" as used herein includes units made up of hardware, software, or firmware, and may be used interchangeably with terms such as logic, logic blocks, components, or circuits. A "module" may be an integrally constructed component or a minimum unit or part thereof that performs one or more functions. For example, a module may include an application-specific integrated circuit (ASIC).

The various embodiments of the disclosure may be implemented as software including an instruction stored in machine (computer)-readable storage media (e.g., internal memory or external memory). The machine is an apparatus which is capable of calling a stored instruction from the storage medium and operating according to the called instruction, and may include an electronic device 100 according to the above-described embodiments. When a command is executed by a processor (e.g., processor 320), the processor may perform a function corresponding to the command using other components directly or under the control of the processor. The command may include a code generated or executed by a compiler or an interpreter. A machine-readable storage medium may be provided in the form of a non-transitory storage medium. Herein, the term "non-transitory" only denotes that a storage medium does not include a signal but is tangible, and does not distinguish the case where a data is semi-permanently stored in a storage medium from the case where a data is temporarily stored in a storage medium.

According to an embodiment, the method according to the above-described various embodiments may be provided as being included in a computer program product. The computer program product may be traded as a product between a seller and a consumer. The computer program product may be distributed in the form of (e.g., a compact disc read only memory (CD-ROM)) or through an application store (e.g., Playstore™ CD-ROM). In the case of online distribution, at least a portion of the computer program product may be at least temporarily stored or temporarily generated in a server of the manufacturer, a server of the application store, or a storage medium such as memory.

Each of the components (e.g., module or program) according to the various embodiments may include a single entity or a plurality of entities, and some of the corresponding sub components described above may be omitted, or another sub component may be further added to the various embodiments. Alternatively or additionally, some of the components (e.g., module or program) may be integrated into one entity and may perform a function carried out by each of the corresponding components before integration in the same or similar manner. Operations performed by a module, a program, or other component, according to various embodiments, may be sequential, parallel, or both, executed iteratively or heuristically, or at least some operations may be performed in a different order, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a sensor module configured to detect an object positioned near the electronic device;
   a display;
   a memory storing instructions; and
   a processor electrically coupled with the sensor module, the display, and the memory,
   wherein the processor, when executing the instructions, is configured to:
      control the display to display first information guiding a portion of a user's body positioned near the electronic device to maintain a first posture,
      acquire a first sensing value by using the sensor module while the first posture is maintained,
      control the display to display second information guiding an object to be positioned on one point of the portion of the user's body,
      acquire a second sensing value for the object by using the sensor module while the object is positioned on the one point, and
      determine a first correction value by using the first sensing value and the second sensing value.

2. The electronic device as claimed in claim 1, wherein the processor, when executing the instructions, is further configured to acquire a sensing value for an object detected that is included in the portion of the user's body by applying the first correction value to a first coordinate system stored in the electronic device.

3. The electronic device as claimed in claim 1, wherein the processor, when executing the instructions, is further configured to:
   control the display to display third information guiding the portion of the user's body to maintain a second posture with respect to the electronic device,
   acquire a third sensing value by using the sensor module while a portion included in the user's body is changed from the first posture to the second posture, and
   set an effective range of a sensing value by using the third sensing value.

4. The electronic device as claimed in claim 3, wherein, based on the portion of the user's body being a back of a hand, the first posture is a state in which the display and a back of a user's hand are parallel with each other, and the second posture is a posture in which the display and the back of the user's hand form an obtuse angle.

5. The electronic device as claimed in claim 3, wherein the processor, when executing the instructions, is further configured to, based on a sensing value included in the effective range being detected through the sensor module, control the display to display the first information.

6. The electronic device as claimed in claim 1, wherein based on the portion of the user's body being a back of a hand, the processor, when executing the instructions, is further configured to:
   control the display to display fourth information guiding a plurality of knuckles included in the back of the hand to be sequentially touched, and
   acquire a fourth sensing value for the touch input by using the sensor module while the plurality of knuckles are touched.

7. The electronic device as claimed in claim 6, wherein the processor, when executing the instructions, is further configured to:
   control the display to display fifth information guiding a finger of the user to be dragged at least once on the portion of the user's body, and
   acquire a fifth sensing value for the drag input by using the sensor module.

8. The electronic device as claimed in claim 7, wherein the processor, when executing the instructions, is further configured to determine a second correction value by using at least one of the fourth sensing value or the fifth sensing value.

9. The electronic device as claimed in claim 8, wherein the processor, when executing the instructions, is further configured to generate user authentication information by combining a sensing value detected from the portion of the user's body with at least one of the first correction value or the second correction value.

10. The electronic device as claimed in claim 7, wherein the processor, when executing the instructions, is configured to:
    control the display to, using at least one characteristic from among a characteristic of the sensor module and an amount of peripheral light of the electronic device, display information for carrying out dragging from a first point to a second point on the portion of the user's body, information for carrying out dragging from a third point to a fourth point, and information for carrying out dragging from a fifth point to a sixth point.

11. The electronic device as claimed in claim 10, wherein, based on the portion of the user's body being the back of the hand, the first point, the third point and the fifth point are points adjacent to a little finger, and the second point, the fourth point and the sixth point are points adjacent to a thumb.

12. A method for controlling an electronic device, the method comprising:
    displaying first information guiding a portion of a user's body positioned near the electronic device to maintain a first posture;
    while the first posture is maintained, acquiring a first sensing value by using a sensor module;
    displaying second information guiding an object to be positioned at one point of the portion of the user's body;
    while the object is positioned at the one point, acquiring a second sensing value for the object by using the sensor module; and
    determining a first correction value by using the first sensing value and the second sensing value.

13. The method as claimed in claim 12, further comprising:

displaying third information guiding the portion of the user's body to maintain a second posture with respect to the electronic device;

while the first posture is changed to the second posture, acquiring a third sensing value by using the sensor module; and setting an effective range of a sensing value by using the third sensing value.

14. The method as claimed in claim 12, further comprising:

based on the portion of the user's body being a back of a hand, displaying fourth information guiding a plurality of knuckles included in the back of the hand to be sequentially touched; and while the user touches the plurality of knuckles, acquiring a fourth sensing value for the touch input by using the sensor module.

15. The method as claimed in claim 14, further comprising:

displaying fifth information guiding a finger of a user to be dragged at least once on the portion of the user's body; and while the user drags the finger at least once, acquiring a fifth sensing value for the drag input.

16. The method as claimed in claim 15, wherein the displaying the fifth information comprises, using at least one characteristic from among a characteristic of the sensor module and an amount of peripheral light of the electronic device, displaying information for carrying out dragging from a first point to a second point on the portion of the user's body, information for carrying out dragging from a third point to a fourth point, and information for carrying out dragging from a fifth point to a sixth point.

17. The method as claimed in claim 15, wherein, based on the portion of the user's body being the back of the hand, the first point, the third point and the fifth point are points adjacent to a little finger, and the second point, the fourth point and the sixth point are points adjacent to a thumb.

18. The method as claimed in claim 15, further comprising:

determining a second correction value by using at least one of the fourth sensing value or the fifth sensing value.

19. The method as claimed in claim 18, further comprising:

generating user authentication information by combining a sensing value detected from the portion of the user's body with at least one of the first correction value or the second correction value.

20. A non-transitory computer readable storage medium that stores instructions, which when executed by a processor of an electronic device, cause the processor to control the electronic device to:

display first information guiding a portion of a user's body positioned near the electronic device to maintain a first posture;

while the first posture is maintained, acquire a first sensing value by using a sensor module;

display second information guiding an object to be positioned on one point of the portion of the user's body;

while the object is positioned on the one point, acquire a second sensing value for the object by using the sensor module; and determine a first correction value by using the first sensing value and the second sensing value.

* * * * *